(12) United States Patent
Clark et al.

(10) Patent No.: US 8,955,767 B1
(45) Date of Patent: Feb. 17, 2015

(54) ROTOR-TYPE IRRIGATION SPRINKLER WITH COARSE AND FINE ARC ADJUSTMENT

(75) Inventors: Michael L. Clark, San Marcos, CA (US); Zachary B. Simmons, San Diego, CA (US)

(73) Assignee: Hunter Industries, Inc., San Marcos, CA (US)

( * ) Notice: Subject to any disclaimer, the term of this patent is extended or adjusted under 35 U.S.C. 154(b) by 498 days.

(21) Appl. No.: 13/343,522

(22) Filed: Jan. 4, 2012

(51) Int. Cl.
*B05B 15/10* (2006.01)

(52) U.S. Cl.
USPC ........................................... 239/206; 239/203

(58) Field of Classification Search
CPC ............. B05B 3/04; B05B 5/10; A01G 25/00
USPC .................. 239/203, 204, 206, 451, 452, 459
See application file for complete search history.

(56) References Cited

U.S. PATENT DOCUMENTS

| | | |
|---|---|---|
| 3,107,056 A | 10/1963 | Hunter |
| 3,329,057 A | 7/1967 | Salz |
| 3,785,565 A | 1/1974 | Perry et al. |
| 4,568,024 A | 2/1986 | Hunter .......................... 239/242 |
| 4,624,412 A | 11/1986 | Hunter .......................... 239/232 |
| 4,625,914 A | 12/1986 | Sexton et al. .................. 239/206 |
| 4,718,605 A | 1/1988 | Hunter .......................... 239/242 |
| 4,948,052 A | 8/1990 | Hunter .......................... 239/242 |
| 5,058,806 A | 10/1991 | Rupar |
| 5,288,022 A | 2/1994 | Sesser |
| 5,375,768 A | 12/1994 | Clark |
| 5,423,486 A | 6/1995 | Hunter |
| 5,456,411 A | 10/1995 | Scott et al. |
| 5,556,036 A | 9/1996 | Chase |
| 5,662,545 A | 9/1997 | Zimmerman et al. ........ 475/344 |
| 5,699,962 A | 12/1997 | Scott et al. |
| 5,711,486 A | 1/1998 | Clark et al. |
| 5,720,435 A | 2/1998 | Hunter |
| 5,762,270 A | 6/1998 | Kearby et al. |
| 5,918,812 A | 7/1999 | Beutler |
| 5,927,607 A | 7/1999 | Scott |
| 5,988,523 A | 11/1999 | Scott |
| 6,042,021 A | 3/2000 | Clark |
| 6,050,502 A * | 4/2000 | Clark ............................ 239/237 |
| 6,082,632 A | 7/2000 | Clark et al. |
| 6,138,924 A | 10/2000 | Hunter et al. |
| 6,227,455 B1 | 5/2001 | Scott et al. |
| 6,241,158 B1 | 6/2001 | Clark et al. |
| 6,244,521 B1 | 6/2001 | Sesser |
| 6,299,075 B1 | 10/2001 | Koller |
| 6,457,656 B1 | 10/2002 | Scott |
| 6,491,235 B1 | 12/2002 | Scott et al. |
| 6,499,672 B1 | 12/2002 | Sesser |

(Continued)

*Primary Examiner* — Davis Hwu

(74) *Attorney, Agent, or Firm* — Knobbe Martens Olson & Bear LLP

(57) ABSTRACT

An irrigation sprinkler includes a riser and a nozzle turret rotatably mounted at an upper end of the riser. A drive assembly is mounted in the riser and is coupled to the nozzle turret for rotating the nozzle turret. The drive assembly includes a reversing mechanism having a pair of arc tabs. A position of one of the arc tabs is adjustable through an adjustable arc setting mechanism to change a size of an angle through which the nozzle turret oscillates to thereby pre-set an arc of coverage of the sprinkler. The adjustable arc setting mechanism includes a first portion that is manually movable to effectuate a coarse adjustment of the position of the adjustable arc tab and a second portion that is manually movable to effectuate a fine adjustment of the position of the adjustable arc tab.

19 Claims, 31 Drawing Sheets

(56) References Cited

U.S. PATENT DOCUMENTS

| | | | |
|---|---|---|---|
| 6,651,905 B2 | 11/2003 | Sesser et al. | |
| 6,688,539 B2 | 2/2004 | Vander Griend | |
| 6,695,223 B2 | 2/2004 | Beutler et al. | |
| 6,732,950 B2 * | 5/2004 | Ingham et al. | 239/205 |
| 6,736,332 B2 | 5/2004 | Sesser et al. | |
| 6,817,543 B2 | 11/2004 | Clark | |
| 6,854,664 B2 | 2/2005 | Smith | |
| 6,869,026 B2 * | 3/2005 | McKenzie et al. | 239/237 |
| 6,871,795 B2 | 3/2005 | Anuskiewicz | |
| 6,945,471 B2 * | 9/2005 | McKenzie et al. | 239/237 |
| 6,957,782 B2 | 10/2005 | Clark et al. | |
| 7,032,836 B2 | 4/2006 | Sesser et al. | |
| 7,040,553 B2 | 5/2006 | Clark | |
| 7,159,795 B2 | 1/2007 | Sesser et al. | |
| 7,240,860 B2 | 7/2007 | Vander Griend | |
| 7,287,711 B2 | 10/2007 | Crooks | |
| 7,303,147 B1 | 12/2007 | Danner et al. | |
| 7,322,533 B2 | 1/2008 | Grizzle | |
| D593,182 S | 5/2009 | Anuskiewicz | |
| 7,530,504 B1 | 5/2009 | Danner et al. | |
| 7,611,077 B2 | 11/2009 | Sesser et al. | |
| 7,621,467 B1 | 11/2009 | Garcia | |
| 7,677,469 B1 | 3/2010 | Clark | 239/242 |
| 7,748,646 B2 | 7/2010 | Clark | |
| 7,828,230 B1 | 11/2010 | Anuskiewicz et al. | |
| 7,861,948 B1 | 1/2011 | Crooks | 239/237 |
| 2005/0133619 A1 | 6/2005 | Clark | |
| 2006/0192029 A1 | 8/2006 | Grizzle | |
| 2006/0273196 A1 | 12/2006 | Crooks | |
| 2008/0257982 A1 * | 10/2008 | Kah et al. | 239/222.11 |
| 2009/0157123 A1 | 6/2009 | Appenzeller et al. | |
| 2009/0224070 A1 | 9/2009 | Clark et al. | |
| 2011/0024522 A1 | 2/2011 | Anuskiewicz | |

* cited by examiner

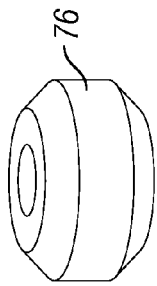
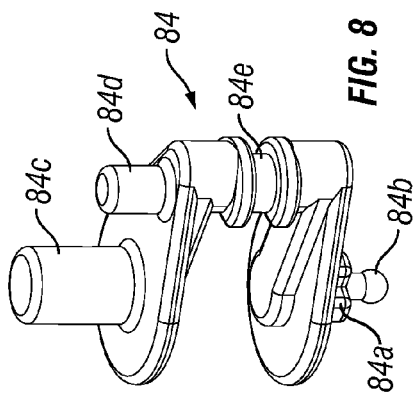
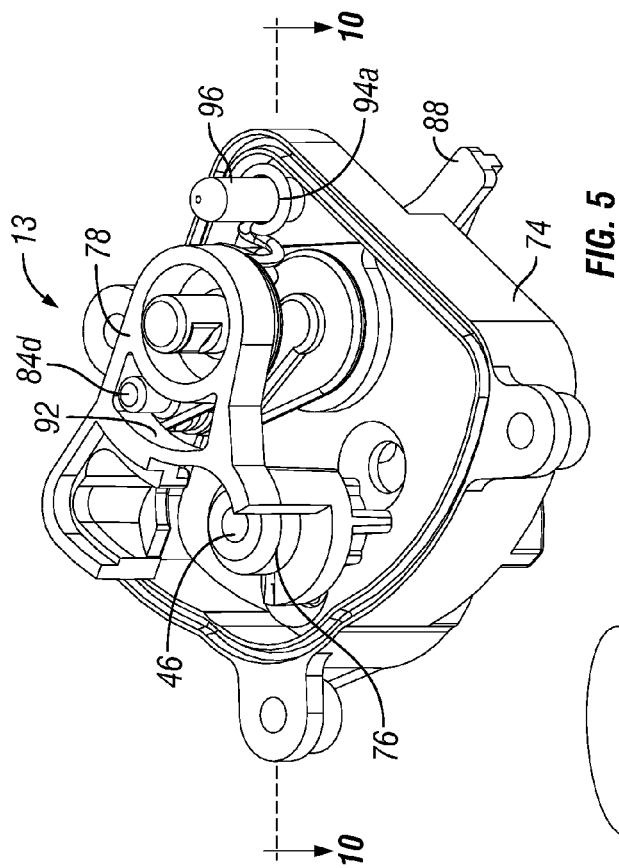
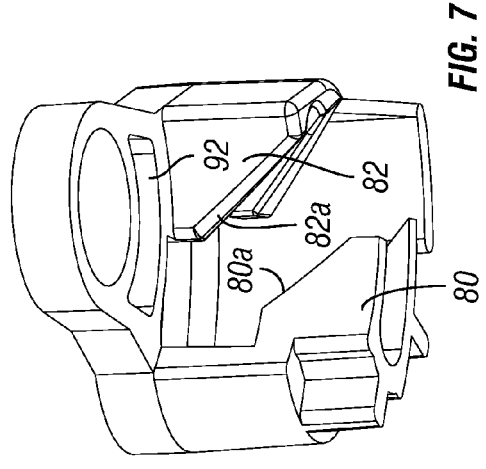

ROTOR-TYPE IRRIGATION SPRINKLER WITH COARSE AND FINE ARC ADJUSTMENT

CROSS-REFERENCE TO RELATED APPLICATIONS

This application is related by subject matter to co-pending U.S. patent application Ser. No. 12/710,265 filed Feb. 22, 2010 by Michael L. Clark et. al. entitled "Reversing Mechanism for an Irrigation Sprinkler with a Reversing Gear Drive" which is a continuation-in-part of U.S. patent application Ser. No. 11/761,911 filed Jun. 12, 2007 by Michael L. Clark entitled "Sprinkler with Reversing Planetary Gear Drive" now U.S. Pat. No. 7,677,469 granted Mar. 16, 2010. This application is also related by subject matter to U.S. patent application Ser. No. 13/343,456 filed on even date herewith by Ronald H. Anuskiewicz et. al. entitled "Planetary Gear Drive Rotor-Type Sprinkler with Adjustable Arc/Full Circle Selection Mechanism." Said applications and patent are all assigned to Hunter Industries, Inc., the assignee of the subject application. The entire disclosures of the aforementioned applications and patent are hereby incorporated by reference.

FIELD OF THE INVENTION

The present invention relates to apparatus for irrigating turf and landscaping, and more particularly, to rotor-type sprinklers having a turbine that rotates a nozzle through a gear train reduction.

BACKGROUND OF THE INVENTION

In many parts of the United States, rainfall is insufficient and/or too irregular to keep turf and landscaping green and therefore irrigation systems are installed. Such systems typically include a plurality of underground pipes connected to sprinklers and valves, the latter being controlled by an electronic irrigation controller. One of the most popular types of sprinklers is a pop-up rotor-type sprinkler. In this type of sprinkler a tubular riser is normally retracted into an outer cylindrical case by a coil spring. The case is buried in the ground and when pressurized water is fed to the sprinkler the riser extends. A turbine and a gear train reduction are mounted in the riser for rotating a nozzle turret at the top of the riser. The gear train reduction is often encased in its own housing and is often referred to as a gear box. A reversing mechanism is also normally mounted in the riser along with an arc adjustment mechanism.

The gear drive of a rotor-type sprinkler can include a series of staggered gears and shafts wherein a small gear on the top of the turbine shaft drives a large gear on the lower end of an adjacent second shaft. Another small gear on the top of the second shaft drives a large gear on the lower end of a third shaft, and so on. Alternatively, the gear drive can comprise a planetary arrangement in which a central shaft carries a sun gear that simultaneously drives several planetary gears on rotating circular partitions or stages that transmit reduced speed rotary motion to a succession of similar rotating stages. The planetary gears of the stages sometimes engage corresponding ring gears formed on the inner surface of the housing. See, for example, U.S. Pat. No. 5,662,545 granted to Zimmerman et al.

Two basic types of reversing mechanisms have been employed in commercial rotor-type sprinklers. In one design a reversing stator switches water jets that alternately drive the turbine from opposite sides to reverse the rotation of the turbine and the gear drive. See for example, U.S. Pat. No. 4,625,914 granted to Sexton et al. The reversing stator design typically employs a long metal shaft that can twist relative to components rigidly mounted on the shaft and undesirably change the reverse point. Stopping the rotation of the stator and changing direction of rotation via alternate water jets does not provide for repeatable arc shift points. Persons that manually set the arc of rotor-type sprinklers that employ a reversing stator design do not get a tactile feel for a stop at the set reverse points.

A more popular design for the reversing mechanism of a rotor-type sprinkler includes four pinion gears meshed together and mounted between arc-shaped upper and lower frames that rock back and forth with the aid of Omega-shaped over-center springs. One of the inner pinion gears is driven by the gear train reduction and the pinion gears on opposite ends of the frames alternately engage a bull gear assembly to rotate the nozzle back and forth between pre-set arc limits. The arc limits are effectuated by a shift dog alternately engaging a fixed arc tab and an adjustable arc tab. See for example, U.S. Pat. Nos. 3,107,056; 4,568,024; 4,624,412; 4,718,605; and 4,948,052, all granted to Edwin J. Hunter, the founder of Hunter Industries, Inc., the assignee of the subject application. The entire disclosures of the five patents just listed are hereby incorporated by reference. While the reversing frame design has been enormously successful, it is not without its own shortcomings. It involves a complicated assembly with many parts that can have operational failures. The main drawback of the reversing frame design is that the pinion gears are held in contact to the outer bull gear with a spring force that is relatively weak. Therefore high head torque forces which are sometimes experienced with this type of sprinkler can cause the reversing frame gears to slip out of engagement or wear out.

Adjusting the arc of coverage of a rotor-type sprinkler is a manual process performed by the user. Some commercially available rotor-type sprinklers are designed to have their arc adjusted from the top of the sprinkler. Typically the arc adjustment mechanism of these sprinklers has a gear reduction such that takes several turns of an arc adjustment shaft to cover the full range of arc setting adjustment. Other commercially available rotor-type sprinklers use an arc adjusting ring that is located on the side of the sprinkler riser that provides a one-to-one arc setting adjustment.

SUMMARY OF THE INVENTION

In accordance with the present invention an irrigation sprinkler includes a riser and a nozzle turret rotatably mounted at an upper end of the riser. A drive assembly is mounted in the riser and is coupled to the nozzle turret for rotating the nozzle turret. The drive assembly includes a reversing mechanism having a pair of arc tabs. A position of one of the arc tabs is adjustable through an adjustable arc setting mechanism to change a size of an angle through which the nozzle turret oscillates to thereby pre-set an arc of coverage of the sprinkler. The adjustable arc setting mechanism includes a first portion that is manually movable to effectuate a coarse adjustment of the position of the adjustable arc tab and a second portion that is manually movable to effectuate a fine adjustment of the position of the adjustable arc tab.

BRIEF DESCRIPTION OF THE DRAWINGS

FIG. 5 is an enlarged isometric view of the reversing mechanism of the sprinkler of FIG. 1 with its upper shift housing removed.

FIG. 6 is an enlarged isometric view of the shift member of the reversing mechanism illustrated in FIG. 5.

FIG. 7 is an enlarged isometric view of the shift fork of the reversing mechanism illustrated in FIG. 5.

FIG. 8 is an enlarged isometric view of the shift crank of the reversing mechanism illustrated in FIG. 5. In FIG. 8 the crank is rotated one-hundred eighty degrees from its orientation illustrated in FIG. 5.

Throughout the drawing figures like reference numerals refer to like parts.

DETAILED DESCRIPTION

In accordance with the present invention, an irrigation sprinkler includes a turbine, a nozzle, a gear drive, and a reversing mechanism. The sprinkler also includes at least one adjustable arc setting mechanism that allows a user to adjust the arc setting from either the side or the top of the sprinkler to increase or decrease the arc of coverage of the sprinkler.

The adjustable arc setting mechanism allows the user to quickly set the arc of coverage with a side adjusting ring that operates with a one-to-one adjustment ratio. The side adjusting ring provides a coarse adjustment that can be less accurate than desired. If the arc setting is not sufficiently accurate, the sprinkler may either miss watering some of the landscaping that was supposed to be watered. The sprinkler may also overshoot the landscaping and spray onto a building or other area that is not intended to be irrigated, thus wasting water and potentially causing damage or safety hazards. The arc setting mechanism of the present invention provides the user with the option of turning a top accessible arc adjusting shaft from the top of the sprinkler with a tool. The top accessible arc adjusting shaft is coupled to the side adjusting ring through a gear reduction. It may take several turns of the top accessible arc adjusting shaft to reach the full arc setting which allows the user to fine tune the arc of coverage of the sprinkler. The user may use either the top accessible arc adjusting shaft, the side adjusting ring, or both, to set the arc of coverage of the sprinkler.

Figure 1:
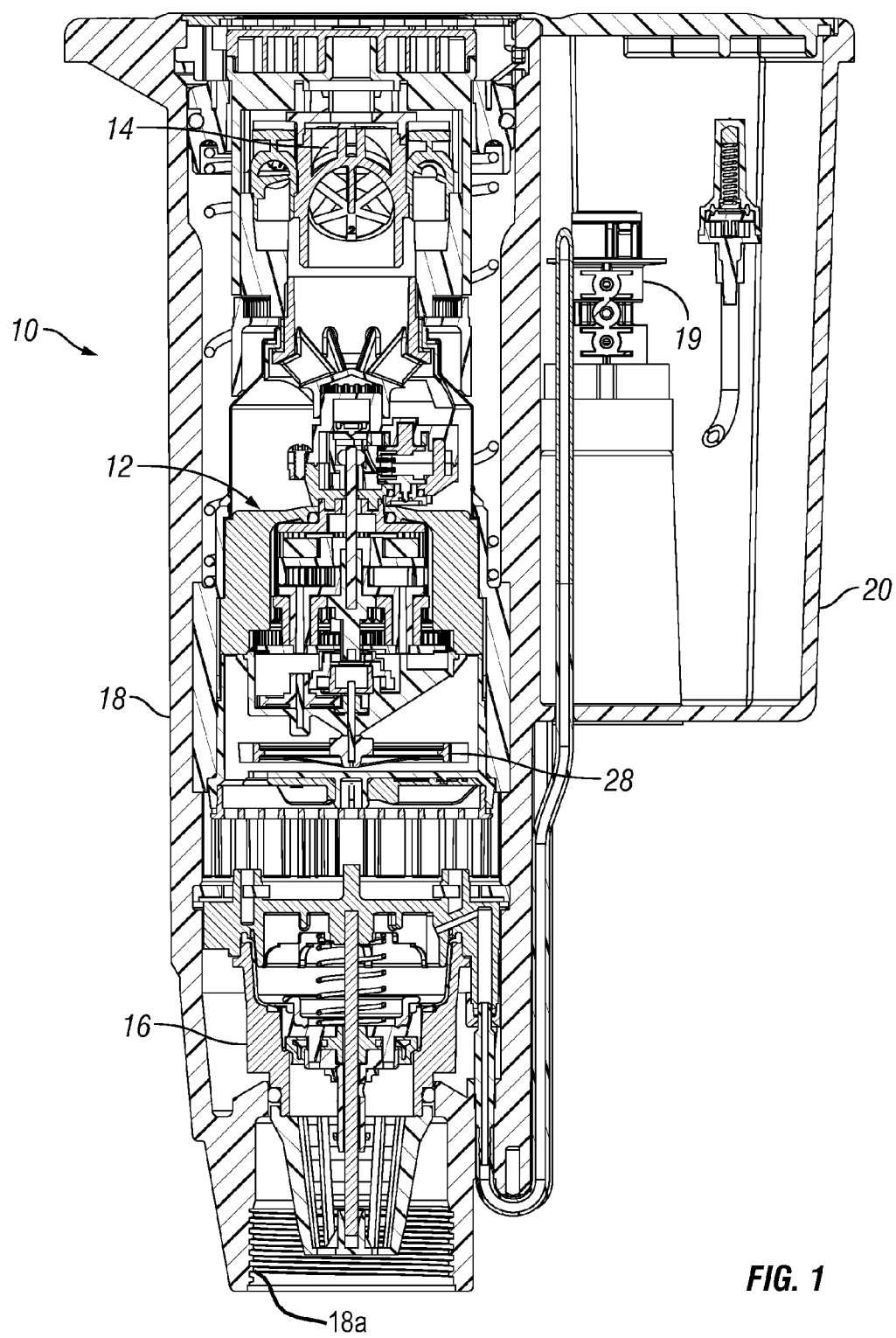
FIG. 1 is a vertical sectional view of a rotor-type sprinkler incorporating an embodiment of the present invention.
Figure 2:
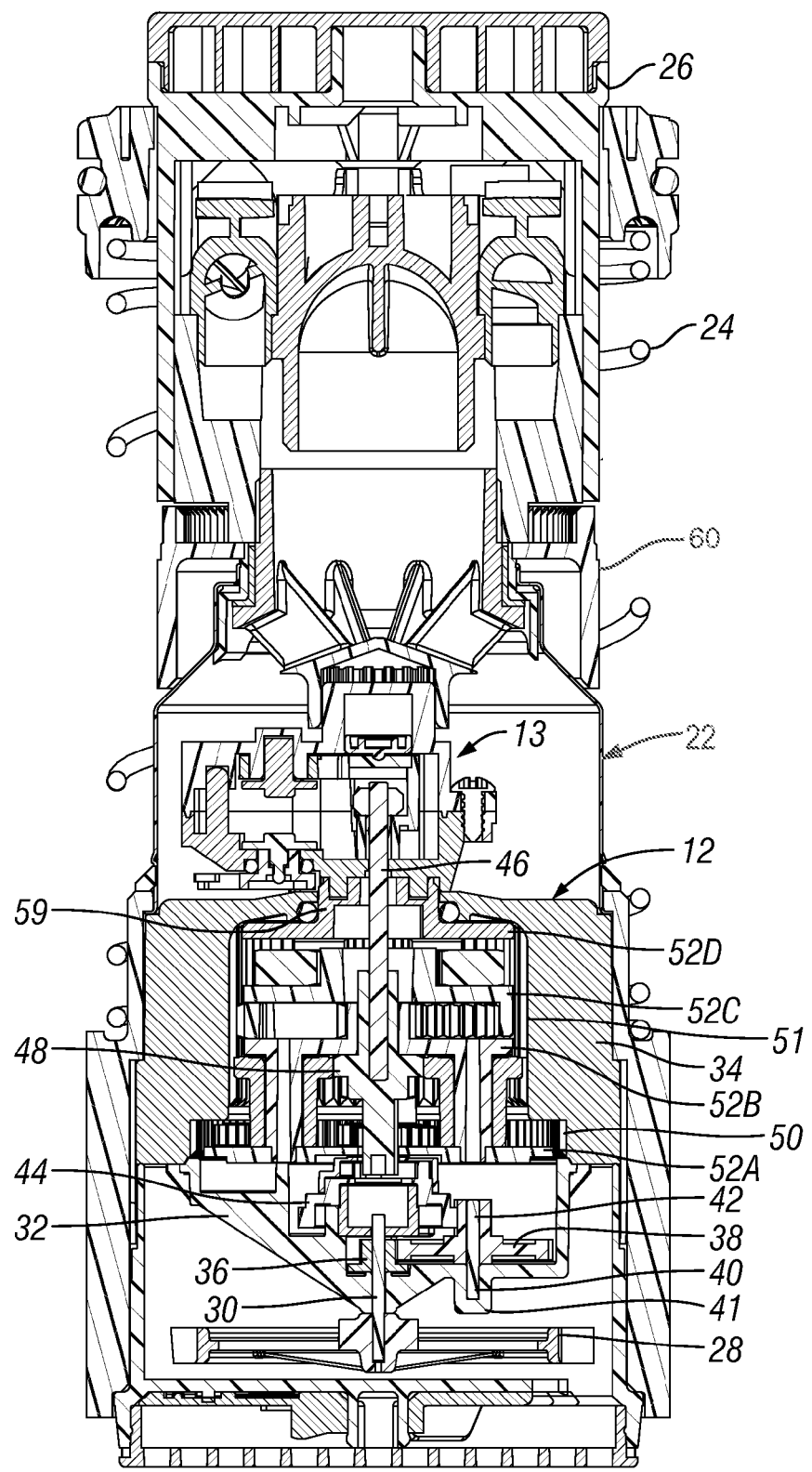
FIG. 2 is an enlarged vertical sectional view of the riser and nozzle turret of the sprinkler of FIG. 1.

Referring to FIG. 1, in accordance with an embodiment of the present invention a rotor-type sprinkler 10 incorporates a reversing planetary gear drive 12 that, through an additional external reversing mechanism 13 (FIG. 2), rotates or oscillates a nozzle 14 between pre-set arc limits. The sprinkler 10 has a construction similar to that disclosed in the aforementioned U.S. patent application Ser. No. 12/710,265. Except for its springs and except for the shafts in the planetary gear drive 12, the other components of the sprinkler 10 are generally made of injection molded plastic. The sprinkler 10 is a so-called valve-in-head sprinkler that incorporates a valve 16 (FIG. 1) in the bottom of a cylindrical outer case 18 which is opened and closed by valve actuator components 19 contained in a housing 20 on the side of the case 18. The sprinkler 10 includes a generally tubular riser 22 (FIG. 2). A coil spring 24 surrounds the riser 22 and normally holds the riser 22 in a retracted position within the outer case 18. The nozzle 14 is carried inside a cylindrical nozzle turret 26 rotatably mounted at the upper end of the riser 22. Together the planetary gear drive 12 and the reversing mechanism 13 provide a drive assembly that is supported inside the riser 22 and is coupled to the nozzle turret 26 for rotating the nozzle turret 26 back and forth between pre-set arc limits as hereafter described in detail. The coil spring 24 is compressible to allow the riser 22 and nozzle turret 26 to telescope from their retracted positions to their extended positions when pressurized water is introduced into the female threaded inlet at the lower end of the outer case 18.

FIG. 2 illustrates further details of the riser 22, nozzle turret 26 and reversing planetary gear drive 12. An impeller in the form of a turbine 28 is rigidly secured to the lower end of a vertically oriented drive input shaft 30. The input shaft 30 extends through the lower cap 32 of a cylindrical gear box housing 34 of the reversing planetary gear drive 12. A turbine pinion gear 36 is rigidly secured to the upper end of the input shaft 30. The turbine pinion gear 36 drives a lower spur gear 38 secured to a spur gear shaft 40. The lower end of the spur gear shaft 40 is journaled in a sleeve 41 integrally formed in the lower cap 32. Another pinion gear 42 is integrally formed on top of the spur gear 38 and drives an upper spur gear 44 of the reversing planetary gear drive 12. Thus the turbine 28 is coupled to an input stage of the planetary gear drive 12.

Figure 14:
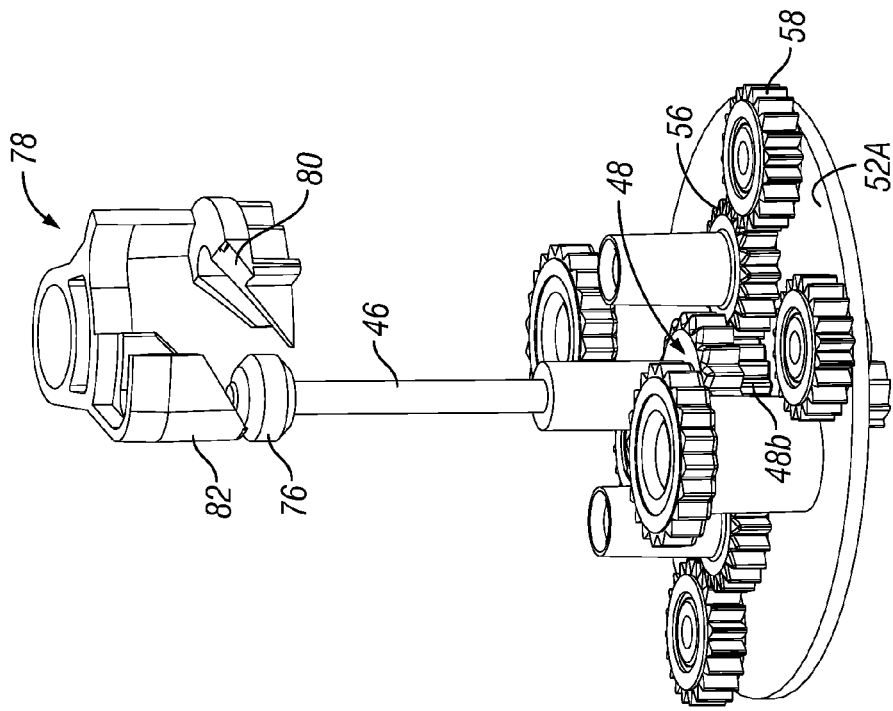
FIGS. 13 and 14 illustrate the raised and lowered positions, respectively, of the bi-level shift sun gear caused when the shift fork pivots and the two differently sloped cams of the shift fork engage and axially move the shift member connected to the upper end of the control shaft.
Figure 13:
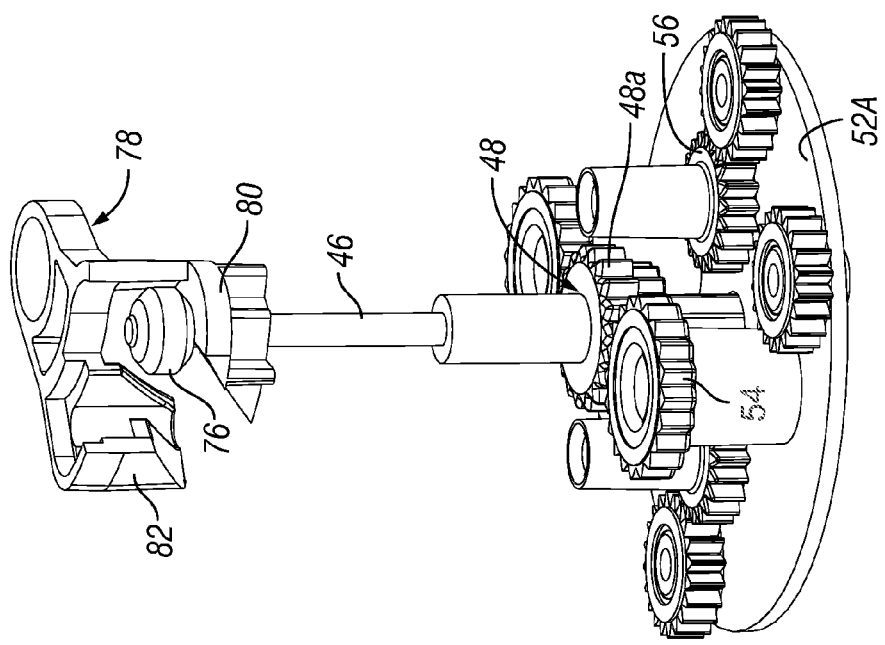

Referring still to FIG. 2, the reversing planetary gear drive 12 has a centrally located main control shaft 46. The lower end of the control shaft 46 is rigidly and co-axially coupled to a bi-level shift sun gear 48 which is vertically reciprocated by axial movement of the control shaft 46 between a raised state illustrated in FIGS. 2 and 13 and a lowered state illustrated in FIG. 14. The interior wall of the cylindrical gear box housing 34 is formed with two adjacent ring gears 50 and 51 located at different axial locations. Each of the ring gears 50 and 51 comprises a plurality of circumferentially spaced, vertically extending, radially inwardly projecting teeth that are engaged by the various planet gears of the reversing planetary gear drive 12. The lower ring gear 50 has a larger diameter and more teeth than the upper ring gear 51. The upper ring gear 51 has a larger axial length than the lower ring gear 50. Together the ring gears 50 and 51 form a bi-level ring gear.

Figure 3:
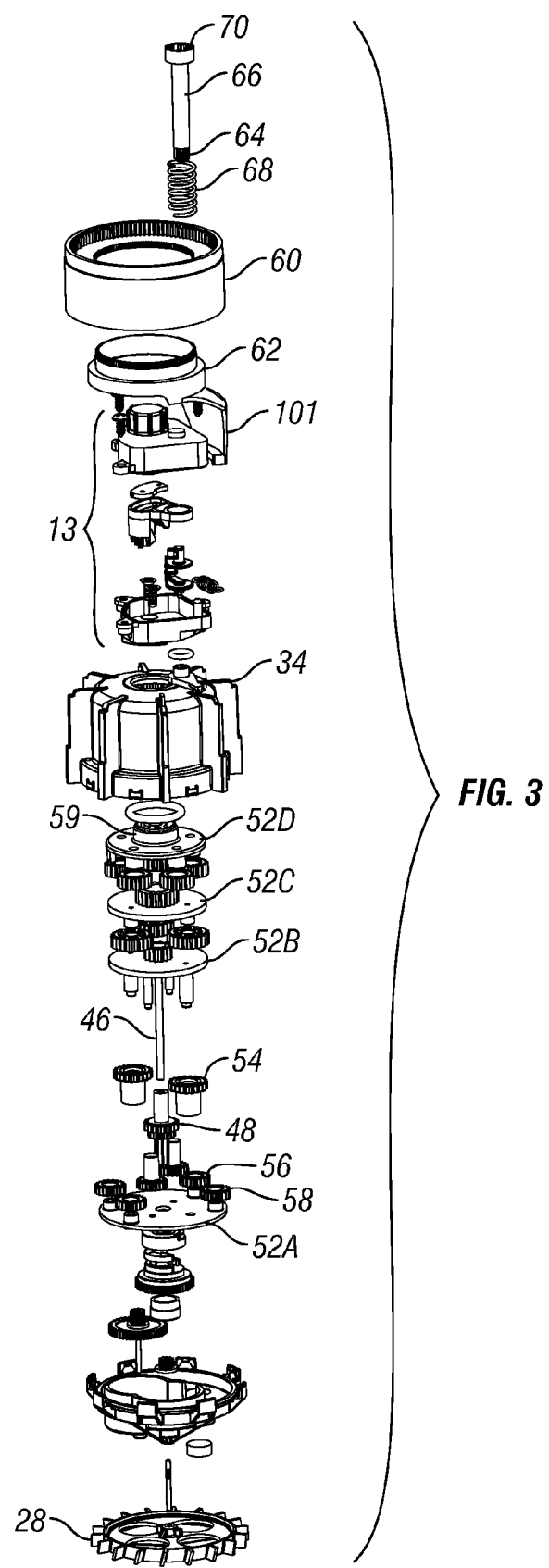
FIG. 3 is an exploded isometric view of the reversing planetary gear drive and additional reversing mechanism of the sprinkler of FIG. 1.

Referring to FIG. 3, the reversing planetary gear drive 12 includes a first disc-shaped stage carrier 52A, a second disc-shaped stage carrier 52B, a third disc-shaped stage carrier 52C, and a fourth disc-shaped stage carrier 52D. The stage carrier 52D functions as an output stage of the planetary gear drive 12. The carriers 52A, 52B, 52C and 52B rotate around the control shaft 46. A central spline opening (not illustrated) in the upper spur gear 44 (FIG. 2) is drivingly coupled to a spline-shaped extension of the bi-level shift sun gear 48 to allow for axial movement of the bi-level shift gear 48 relative to the upper spur gear 44. Thus the upper spur gear 44 continuously rotates the bi-level shift sun gear 48 and the control shaft 46 during vertical axial reciprocating movement of the control shaft 46 and the bi-level shift sun gear 48.

When the bi-level shift sun gear 48 is in its raised state (FIGS. 2 and 13) the larger diameter upper stage 48a (FIG. 13) thereof engages and meshes with a complementary planet gear 54. When the bi-level shift sun gear 48 is in its lowered state (FIG. 14) the smaller diameter lower stage 48b thereof engages and meshes with a complementary idler gear 56. The different gear profiles of the upper and lower stages of the bi-level shift sun gear 48 are important in matching the rotational speed of the nozzle 14 in both the clockwise and counter-clockwise directions. The planet gear 54 directly meshes with the upper ring gear 51 (FIG. 2) formed on the interior wall of the gear box housing 34. The idler gear 56 (FIG. 13) engages another planet gear 58 (FIG. 14) which in turn engages the lower ring gear 50 (FIG. 2). Thus the direction of rotation subsequently carried through the remaining stages of the reversing planetary gear drive 12 is reversed by up and down movement of the control shaft 46 and the bi-level shift sun gear 48 carried therewith.

The bi-level shift sun gear 48 (FIGS. 13 and 14) has a neutral position between the planet gear 54 and the idler gear 56 in which it is not engaged with either of these two gears. This precludes any possibility that the bi-level shift sun gear 48 will strip either or both of the gears 54 and 56. The bi-level shift sun gear 48 always rotates as a result of the upstream rotating gears that are driven by the turbine 28. If the gear teeth of the bi-level shift sun gear 48 do not immediately engage with one of the gears 54 and 56 during shifting, the teeth of the bi-level shift sun gear 48 will align within one tooth of rotation. The bi-level shift sun gear 48 is spring biased both upwardly and downwardly from this neutral position by an over-center spring mechanism (hereafter described) inside the reversing mechanism 13 (FIG. 2). This ensures that the planetary gear drive 12 will be in one of two driving states, either rotating the nozzle 14 clockwise or rotating the nozzle 14 counter-clockwise.

The level of rotational torque on the planet gears 54 and 58 (FIGS. 13 and 14) is very low since they rotate at relatively high RPM. The meshing of the bi-level shift sun gear 48 with the planet gear 54 and the idler gear 56 is very smooth. The smooth shifting transition is largely determined by its vertical position inside the planetary gear drive 12. The rotational speed of the turbine 28 is very high. If the shift sun gear 48 is placed too close to the turbine 28 in terms of the stage of the gear train reduction, the rotational speed of the bi-level shift sun gear 48 will be too fast, and shifting the direction of rotation will be difficult as the gear teeth will tend to skip past each other instead of meshing smoothly. Likewise, the final output stage (carrier 52D) of the reversing planetary gear drive 12 generates substantial rotational torque. If the shift sun gear 48 is placed too close to the final output stage in terms of the stage of the gear train reduction, the excessive torque will make it difficult for the teeth of the shift sun gear 48 to slip axially across the faces of the planet gear 54 and idler gear 56 and shifting will be difficult. The pitch of the gears on the upper and lower stages of the bi-level shift sun gear 48, the idler gear 56 and the planet gears 54 and 58 must match that of the respective ring gears 50 and 51 in order that they mesh properly. However, it is not necessary that the pitch of the teeth on the upper ring gear 51 is the same as those on the lower ring gear 50 as they are completely independent drive sections of the reversing planetary gear drive 12.

The reversing planetary gear drive 12 further includes additional sun gears and planet gears which need not be described in detail as they will be readily understood by those skilled in the art of sprinkler design as illustrated in FIGS. 2 and 3. The other planet gears also engage the ring gears 50 or 51 and rotate about corresponding fixed cylindrical posts that extend vertically from their associated disc-shaped carriers 52A, 52B, 52C and 52D. Each centrally located non-shifting sun gear is rigidly secured to, or integrally formed with, one of the carriers 52B, 52C and 52D. The uppermost carrier 52D has an upwardly projecting central section 59 (FIG. 2) that is coupled to the underside of the reversing mechanism 13 in order to rotate the same. The reversing mechanism 13 in turn supports and rotates the nozzle turret 26. With this arrangement of gears the high RPM of the turbine 28 is successively reduced so that the final output RPM is relatively low, and the output torque at the central section 59 of the uppermost carrier 52D is relatively high. For example, the turbine 28 may rotate at eight hundred RPM and the central section 59 of the uppermost carrier 52D may rotate at an RPM of less than one.

Thus the sprinkler 10 uses the planetary gear drive 12 and the additional reversing mechanism 13 to change the direction of rotation of the nozzle turret 26. The overall reversing mechanism of the sprinkler 10 has two portions, namely, the components of the reversing mechanism 13 that are located externally of the gear box housing 34, and another portion that is contained within the planetary gear drive 12 that includes the bi-level shifting sun gear 48, planetary gear 54, idler gear 56, and planetary gear 58. The advantage of including at least a portion of the overall reversing mechanism inside the planetary gear drive 12 is that the shifting can be done in a low torque region of the planetary gear drive 12 where damage and wear to gears is much less likely to occur. This eliminates the need to use conventional arc-shaped shifting frames with delicate pinion gears that engage a bull gear assembly and bear large loads. The planetary gear drive 12 can deliver relatively high rotational torque to the nozzle turret 26 in a manner that is useful in large rotor-type sprinklers of the type that are employed to water large areas such as golf courses and playing fields. Such high torque may prematurely wear out and/or strip conventional pivoting gear train reversing mechanisms. The different gear tooth profiles of the ring gears 50 and 51 and the upper and lower stages of the bi-level shift sun gear 48 desirably result in the nozzle 14 rotating in both the clockwise and counter-clockwise directions at the same substantially uniform predetermined speed of rotation.

High output torque is important for large area irrigation sprinklers. Sprinklers of this type can discharge seventy-five gallons of water per minute (GPM) at one-hundred and twenty pounds per square inch (PSI) throwing water one hundred and fifteen feet from the sprinkler. Discharging water at such a high flow rate and pressure creates substantial downward and radial forces on the nozzle turret 26 that result in significant drag and resistance to rotation of this key component of a rotor-type sprinkler. The gear drives utilized in this type of sprinkler must overcome this resistance. Additional details regarding the reversing planetary gear drive 12 are disclosed in co-pending U.S. patent application Ser. No. 12/710,298 filed by Michael L. Clark and Zachary B. Simmons filed on Feb. 22, 2010 and entitled "Irrigation Sprinkler with Reversing Planetary Gear Drive Including Two Ring Gears with Different Profiles", the entire disclosure of which is hereby incorporated by reference. The aforementioned application is also assigned to Hunter Industries, Inc.

Figure 4:
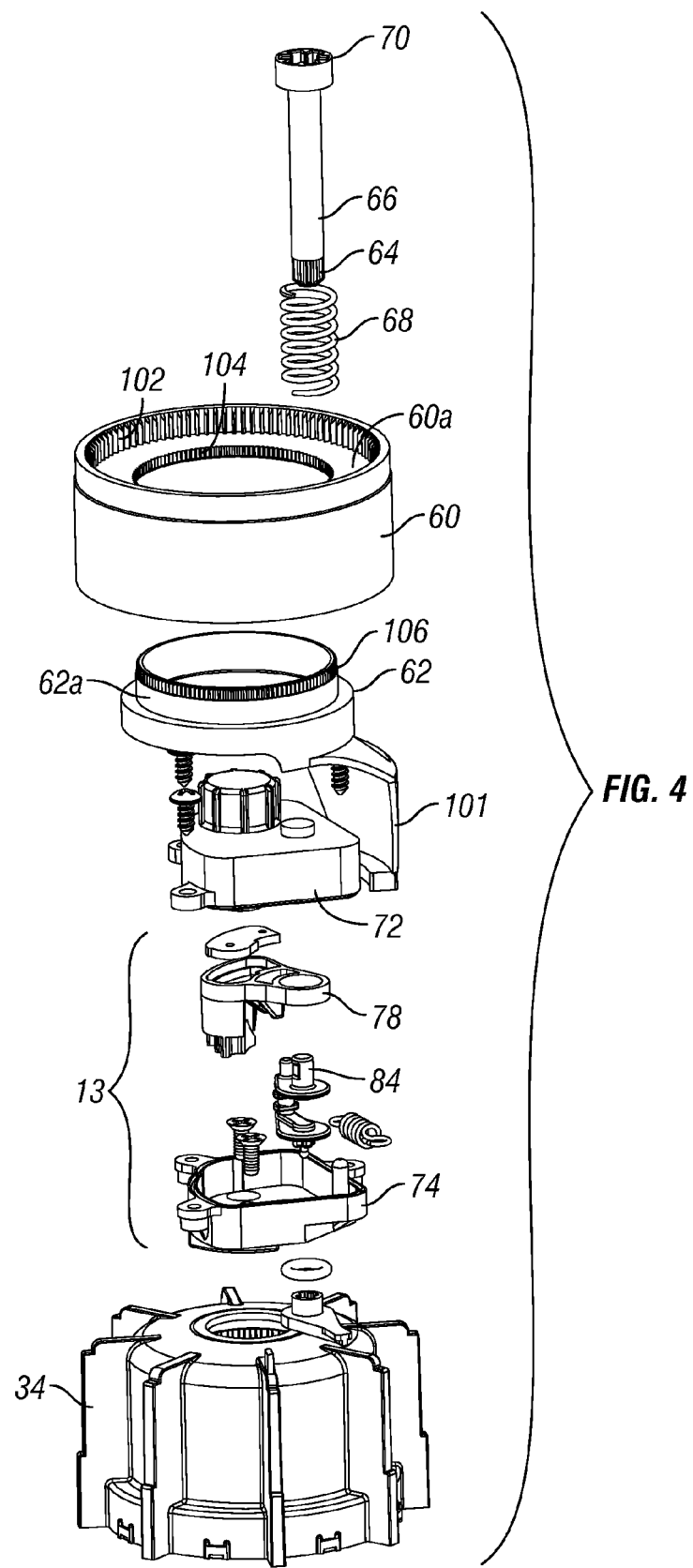
FIG. 4 is an enlarged view of a portion of FIG. 3 illustrating further details of the additional reversing mechanism, bull gear ring, carrier ring and adjusting gearing of the sprinkler of FIG. 1.
Figure 12:
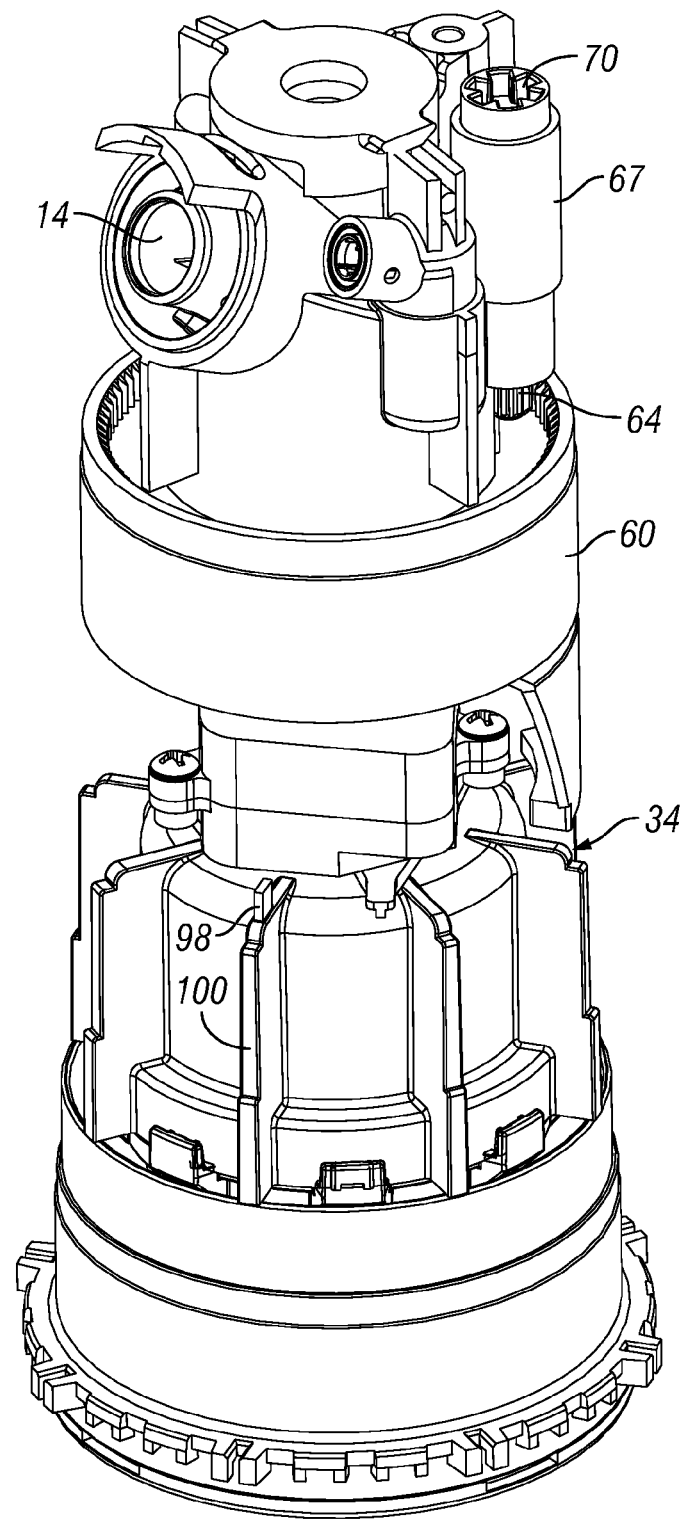
FIG. 12 is an isometric view of the assembled sprinkler components illustrated in the exploded view of FIG. 3.
Figure 24:
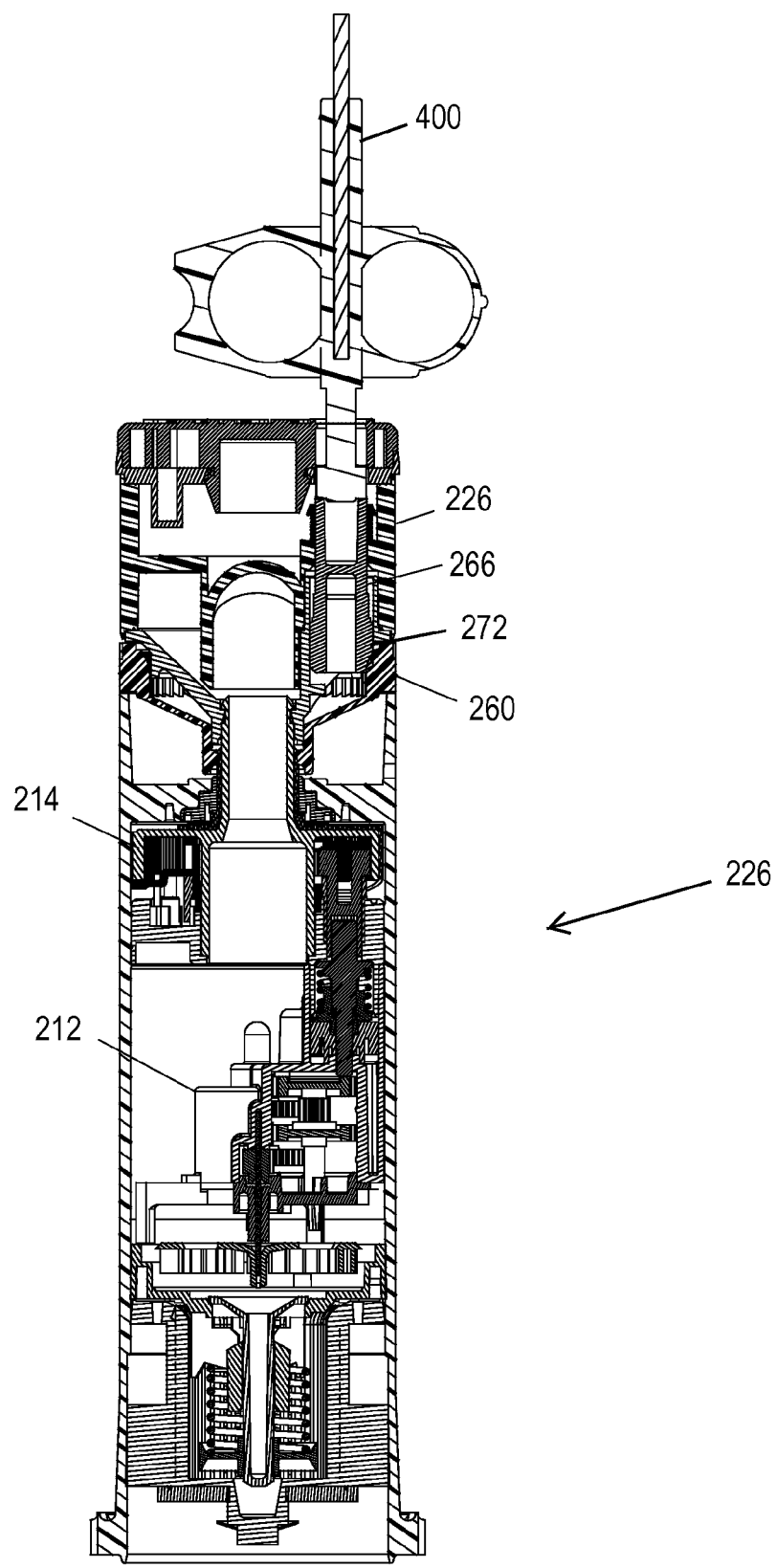
FIG. 24 illustrates the riser of the sprinkler of FIG. 23 with an arc adjusting tool inserted into the top of the riser.
Figure 25:
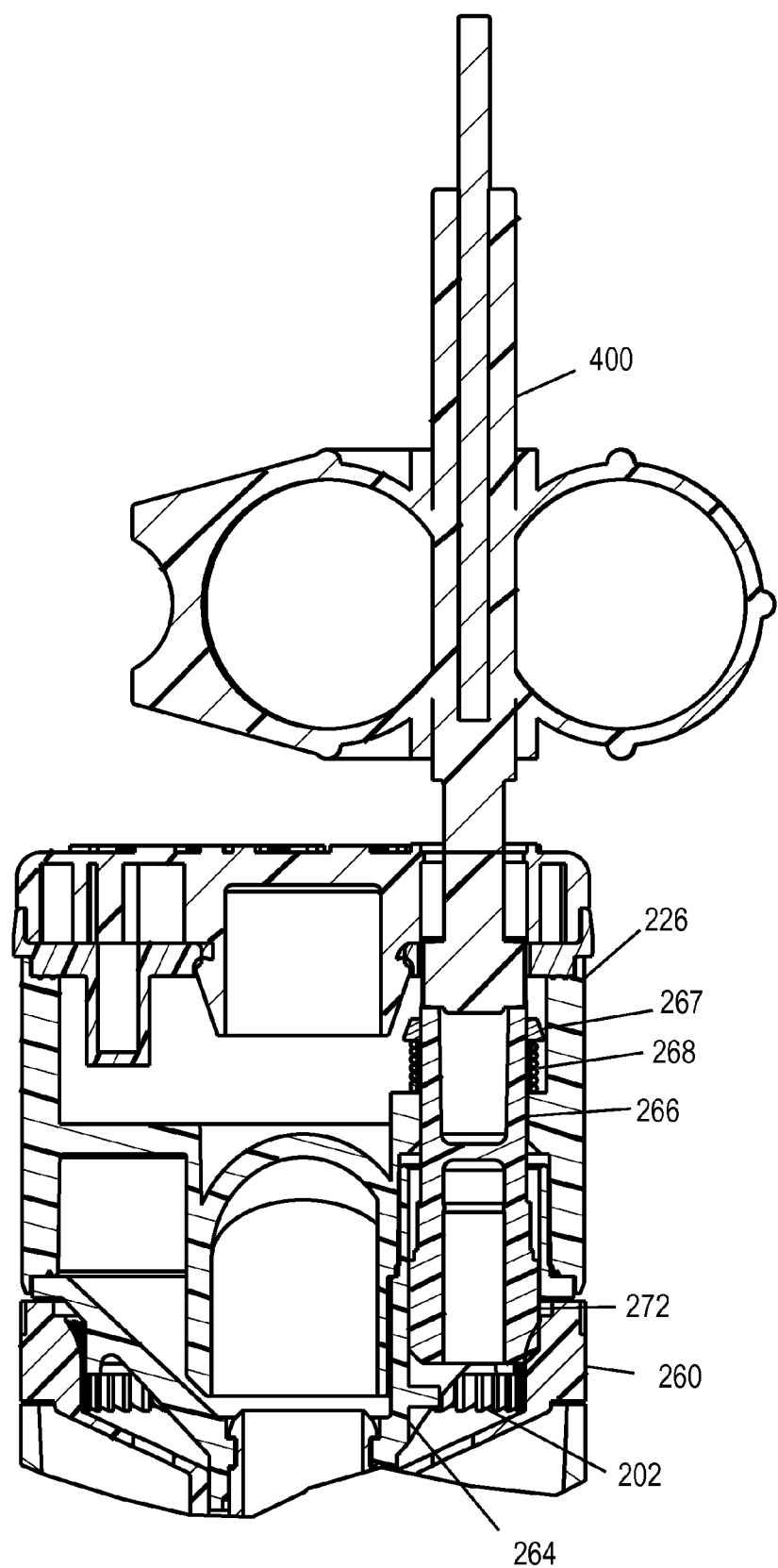
FIG. 25 is an enlarged portion of FIG. 24 illustrating the arc adjusting components with the top arc adjusting shaft in its lowered position and coupled with the side adjusting ring

The fast spinning turbine 28 can slowly rotate the nozzle turret 26 through the reversing planetary gear drive 12 and the additional reversing mechanism 13. The additional reversing mechanism 13 includes cams and components that lift and drop the output shaft 46. A side adjusting ring 60, carrier ring 62 and an adjusting gear 64 (FIG. 4) cooperate with the reversing mechanism 13 to permit user adjustment of the size of the arc of oscillation of the nozzle 14 which in turn determines the arc of coverage of the sprinkler 10. The adjusting gear 64 is formed on the lower end of an arc adjusting shaft 66 that extends through a sleeve 67 (FIG. 12) formed in the nozzle turret 26. The arc adjusting shaft 66 extends through a coil spring 68 (FIG. 4). The coil spring 68 normally elevates the adjusting gear 64 away from an inner toothed ring 102 formed on the inside of an upper segment of the side adjusting ring 60 during normal operation of the sprinkler 10 to allow the nozzle turret 26 to rotate relative to the side adjusting ring 60. An upper end 70 of the arc adjusting shaft 66 is formed with a socket that can be engaged with the end of a HUNTER® tool 400 (FIGS. 24 and 25). The user can exert downward pressure on the arc adjusting shaft 66 with the adjusting tool 400 to overcome the force of the spring 68 and engage the adjusting gear 64 with the toothed ring 102 to accomplish a fine adjustment of the arc of coverage of the sprinkler 10. When the adjusting gear 64 is engaged with the toothed ring 102 a gear drive with a very low gear drive ratio is established. Thus manual rotation of the arc adjusting shaft 66 with the tool 400 slowly rotates the side adjusting ring 60 and changes the circumferential position of an adjustable arc tab 101 (FIG. 4). To provide quicker coarse adjustment of the arc of coverage, the installer can alternatively grip the side adjusting ring 60 between the thumb and index finger and rotate the same to thereby generate a direct one-to-one adjustment of the size of the arc of coverage of the sprinkler 10. As explained hereafter, the side adjusting ring 60 is directly coupled to the carrier ring 62 from which the adjustable arc tab 101 extends. Thus the drive ratio between the side adjusting ring 60 and the carrier ring 62 is much higher than the drive ratio between the arc adjusting shaft 66 and the carrier ring 62.

The reversing mechanism 13 includes an upper shift housing 72 (FIG. 4) and a lower shift housing 74 that mate to form a complete housing with a hollow interior that encloses most of the other components of the reversing mechanism 13 hereafter described. The reversing mechanism 13 further includes a semi-spherical, i.e. barrel-shaped shift member 76 (FIGS. 5 and 6) that is rigidly secured to the upper end of the control shaft 46. The reversing mechanism 13 further includes a pivotable shift fork 78 (FIGS. 5 and 7) with first and second spaced apart cams 80 and 82. The first cam 80 is configured with a sloped surface 80*a* (FIG. 7) that raises the control shaft 46 when the shift fork 78 is pivoted to engage the first cam 80 with the shift member 76. The second cam 82 is configured with an oppositely sloped surface 82*a* that lowers the control shaft 46 when the shift fork 78 is pivoted to engage the second cam 82 with the shift member 76.

Figure 10:
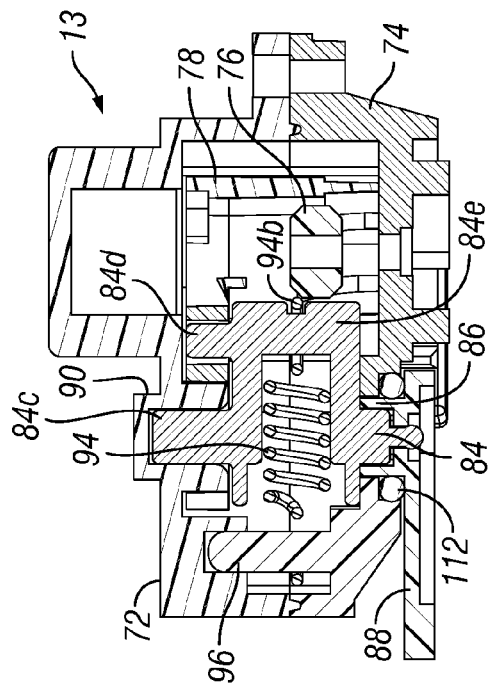
FIG. 10 is a vertical sectional view of the reversing mechanism taken along line 10-10 of FIG. 5 with the upper shift housing added.
Figure 11:
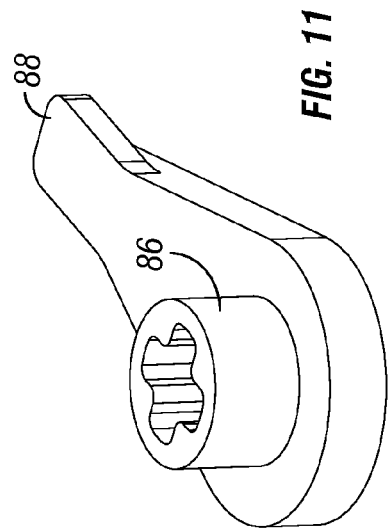
FIG. 11 is an enlarged isometric view of the shift toggle of the reversing mechanism of FIG. 5.
Figure 9:
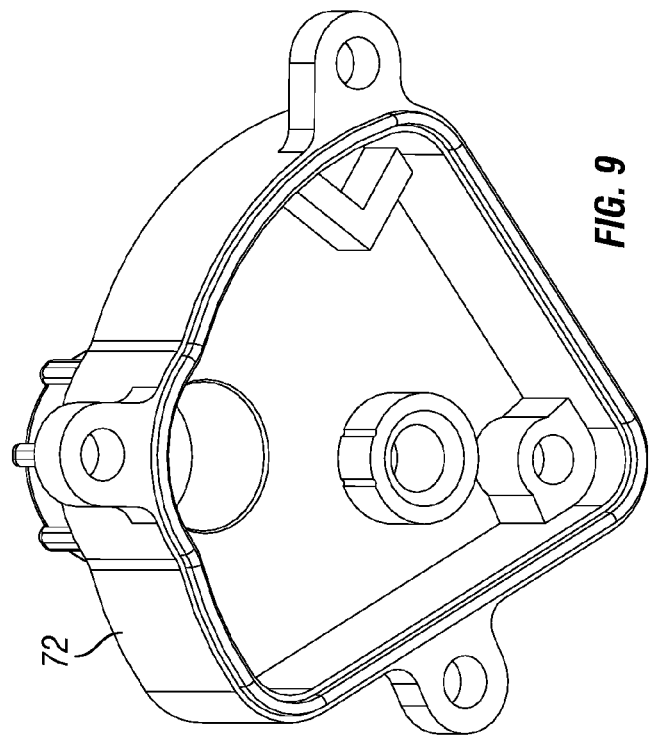
FIG. 9 is an enlarged isometric view of the upper shift housing of the reversing mechanism of FIG. 5 taken from the underside thereof.

The reversing mechanism 13 further includes a shift crank 84 (FIG. 8) that pivotally supports the shift fork 78 inside the joined upper and lower shift housings 72 and 74. The shift crank 84 has a lower spline shaft segment 84*a* with a rounded terminal portion 84*b* that are secured in a mating hub 86 (FIG. 10) formed on the inner end of a shift toggle 88 (FIG. 11). The spline shaft segment 84*a* interfaces with a mating cross-shaped opening in the hub 86 to rotationally lock them together so the movement of the shift toggle 88 directly forces the shifting movement of the shift crank 84. An O-ring 112 surrounds the hub 86. The shift crank 84 has an upper enlarged cylindrical segment 84*c* (FIG. 8) that is journaled in a cylindrical sleeve 90 (FIG. 10) formed in the upper shift housing 72. Another cylindrical segment 84*d* (FIG. 8) of the shift crank 84 is loosely constrained inside a curved guide pocket 92 (FIGS. 5 and 7) formed in the shift fork 78 thereby providing a lost motion linkage. An over-center coil spring 94 (FIG. 10) biases the shift fork 78 so that either the first cam 80 or the second cam 82 is engaged with the shift member 76. The over-center spring 94 has a first end 94*a* (FIG. 5) connected to a post 96 that extends from the lower shift housing 74 and a second end 94*b* (FIG. 10) connected to a central segment 84*e* of the shift crank 84.

The sprinkler 10 is thus designed to have the size of its arc of oscillation adjusted from the top of the nozzle turret 26 as well as from the side of the riser 22. A fixed arc tab 98 (FIG. 12) is integrally formed on the upper end of one of the radial fins 100 of the cylindrical gear box housing 34 of the reversing planetary gear drive 12. The fixed arc tab 98 is positioned in a predetermined circumferential location so that the fixed arc tab 98 can be engaged by the outer end of the shift toggle 88 as the housing of the reversing mechanism 13 are rotated by the planetary gear drive 12. The housing of the reversing mechanism 13 is comprised of the joined upper and lower shift housings 72 and 74. When the outer end of the shift toggle 88 engages the fixed arc tab 98 it pivots the shift toggle 88, causing the shift fork 78 to pivot. As a result of the pivoting of the shift fork 78 the first cam 80 engages the shift member 76 as illustrated in FIG. 5. The first cam 80 axially lifts the shift member 76 and the control shaft 46 connected thereto, causing the bi-level shift sun gear 48 to move axially to its raised position inside the planetary gear drive illustrated in FIG. 13. This reverses the direction of rotation of the nozzle turret 26. The over-center spring 94 ensures positive motion of the shift fork 78 to one of its operative positions, preventing the shift fork 78 from sticking in the middle of its range of motion where neither of the cams 80 and 82 is engaged with the shift member 76. This would undesirably cause the rotation of the nozzle turret 26 to stall, i.e. become stationary, or rotate in only one direction.

Figure 18:
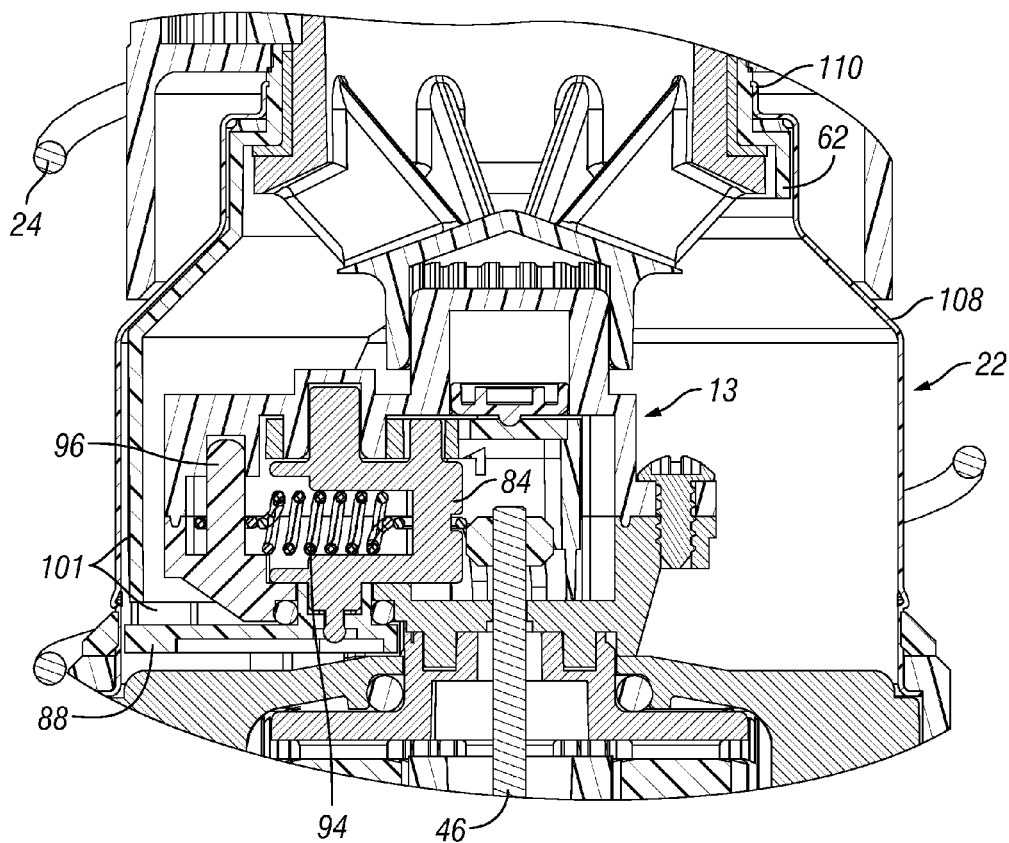
FIG. 18 is an enlarged fragmentary vertical sectional view of the riser of FIG. 2 taken from a different angle illustrating the adjustable arc tab engaging the shift toggle.
Figure 19:
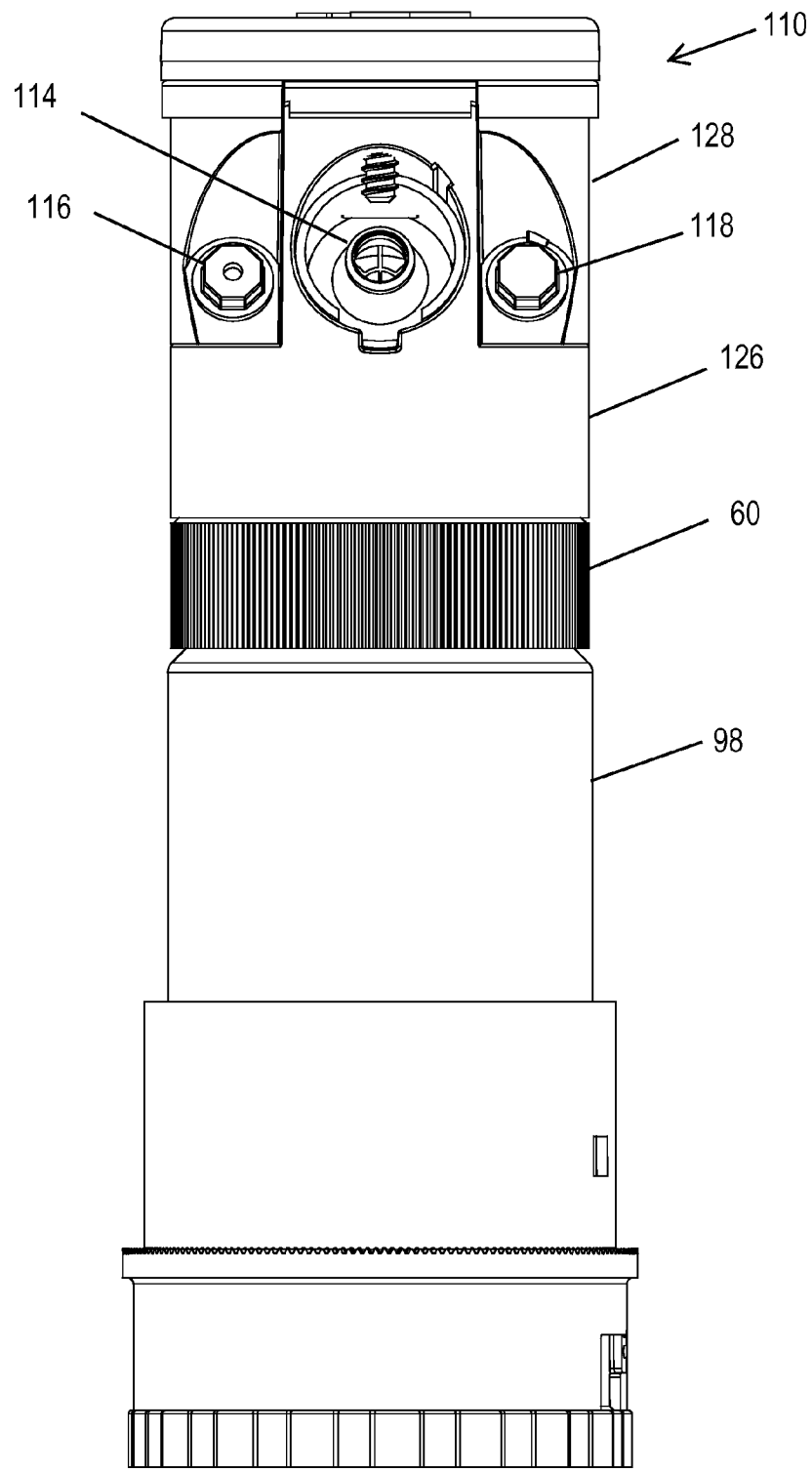
FIG. 19 is an elevation view of another embodiment of the present invention that includes a nozzle turret with a removable secondary nozzle holder.

The carrier ring 62 (FIG. 4) is snap fit at a joint 110 (FIG. 18) to the inside of a cylindrical stainless steel riser sleeve 108 and does not rotate during normal operation of the sprinkler 10. The combination of materials and the snap fit allow the carrier ring 62 to rotate only when the side adjusting ring 60 is directly turned by hand or turned via the adjusting gear 64. The side adjusting ring 60 is drivingly coupled to the carrier ring 62 by engaging a plurality of serrations 104 (FIG. 4) formed on the inside of the side adjusting ring 60 with a plurality of teeth 106 formed on the exterior of an upper segment of the carrier ring 62. The adjustable arc tab 101 (FIG. 18) is integrally formed with, and extends from the carrier ring 62 in a predetermined circumferential location so that the adjustable arc tab 101 can be engaged by the shift toggle 88 as the housing of the reversing mechanism 13 is rotated by the planetary gear drive 12. When the adjustable arc tab 101 engages the shift toggle 88 as illustrated in FIG. 18 the shift toggle 88 pivots. This in turn pivots the shift fork 78. This causes the second cam 82 to engage the shift member 76 and axially force the shift member 76 and the control shaft 46 connected thereto downwardly. This causes the bi-level shift sun gear 48 to move axially to its lowered position inside the planetary gear drive 12 illustrated in FIG. 14. This reverses the direction of rotation of the nozzle turret 26.

Figure 15:
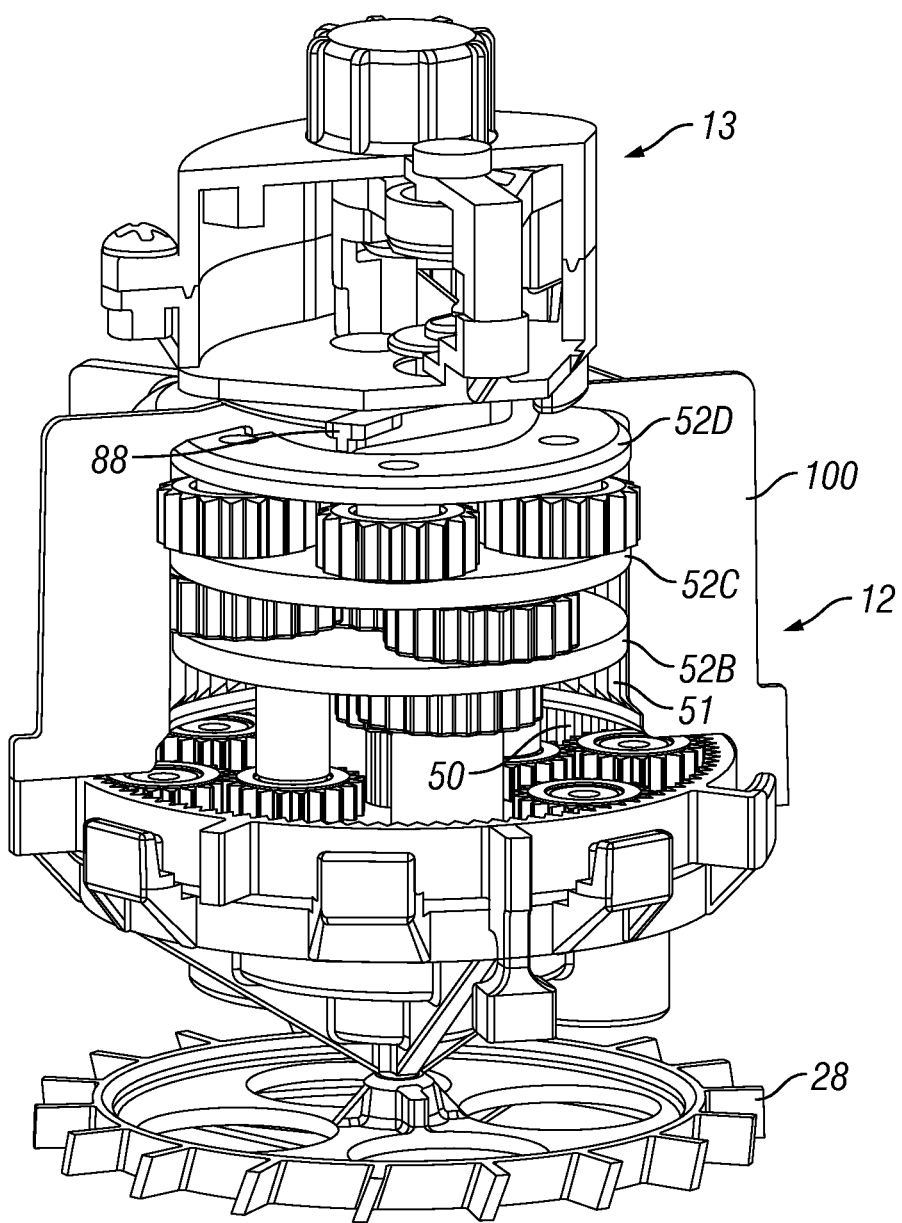
FIGS. 15 and 16 illustrate the two different configurations of the reversing planetary gear drive and reversing mechanism of the sprinkler of FIG. 1 that cause the nozzle turret to rotate in opposite directions.
Figure 16:
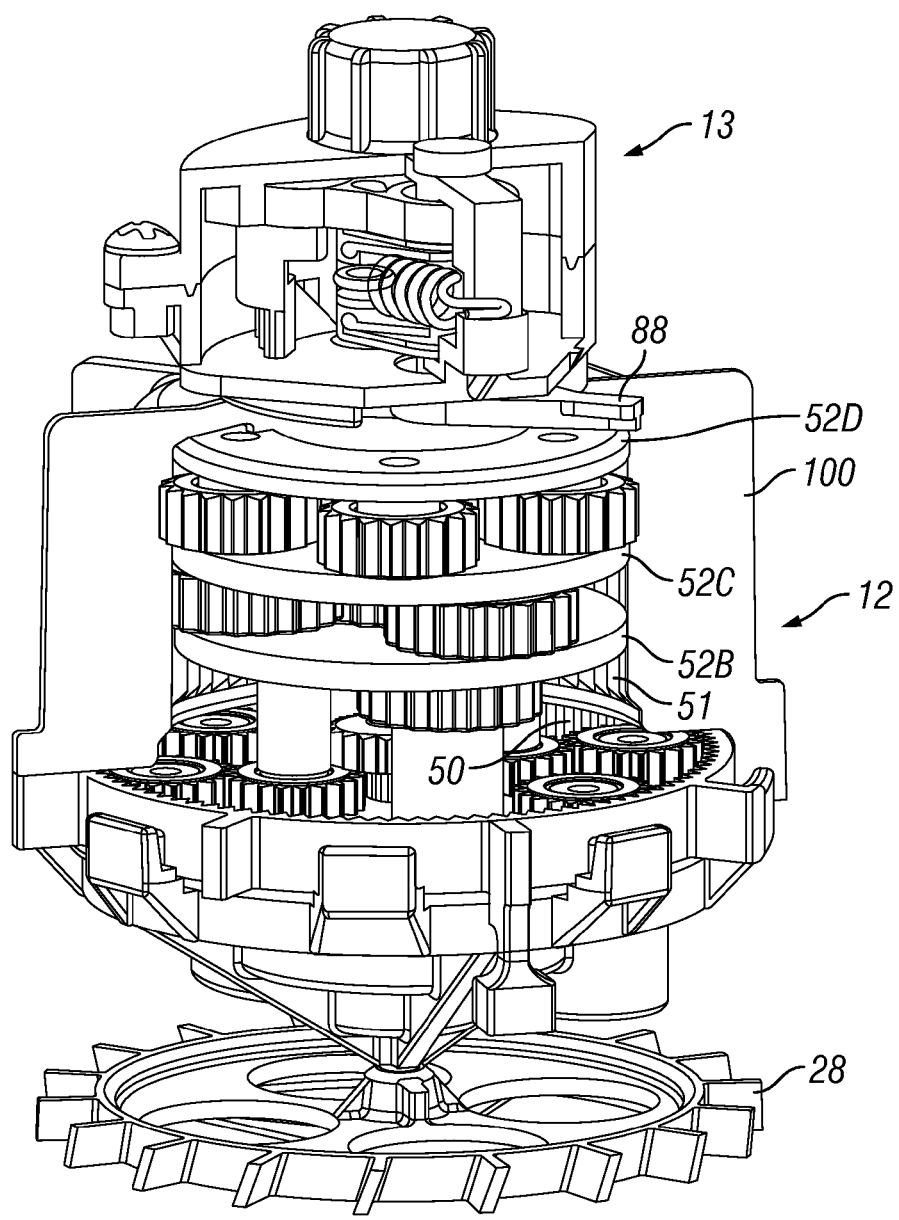
Figure 17:
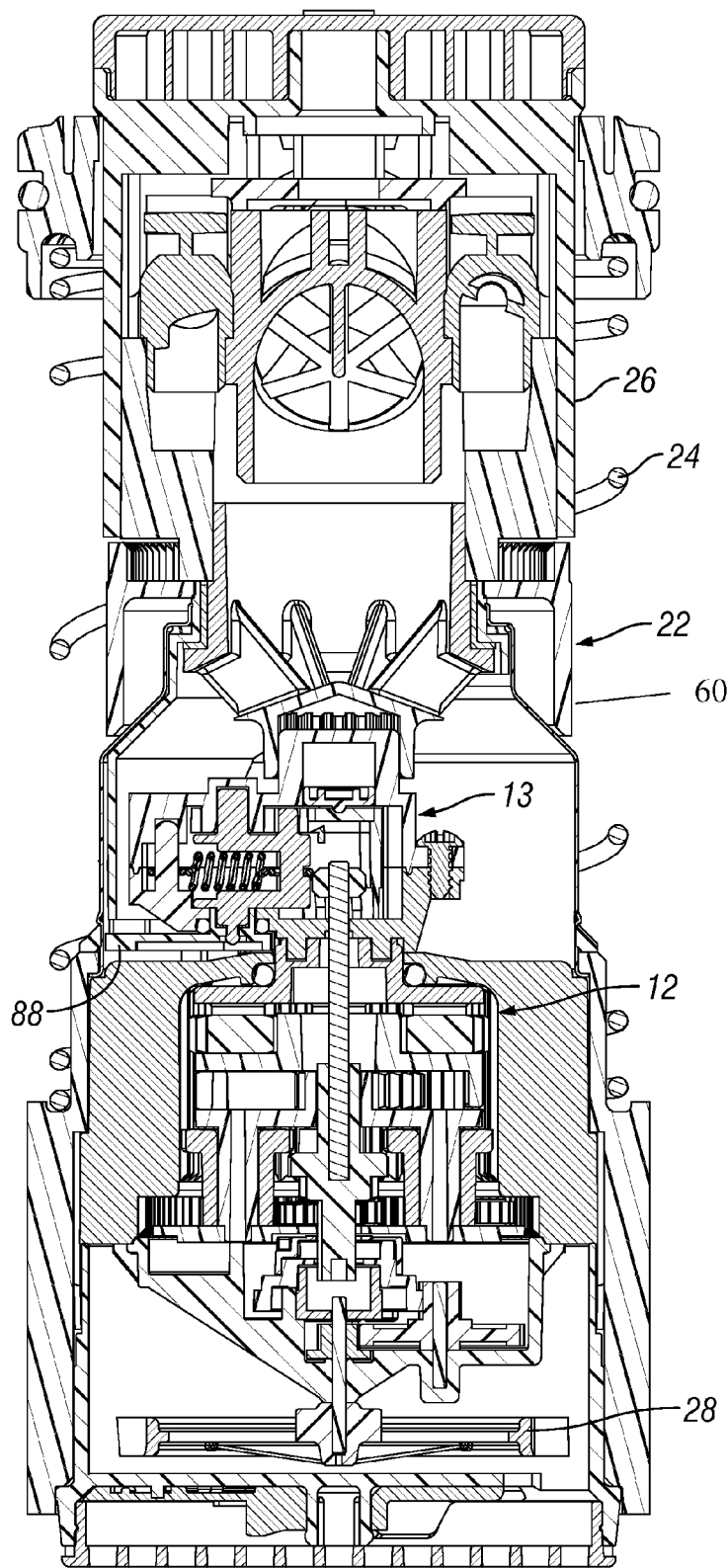
FIG. 17 is a vertical sectional view similar to FIG. 2 illustrating the fixed arc tab engaging the shift toggle of the reversing mechanism of FIG. 5.

The adjusting gear 64 (FIG. 4) can be rotated by manually depressing and twisting the arc adjusting shaft 66 inside the nozzle turret 26 with the tool 400. The adjusting gear 64 has gear teeth that engage and mesh with complementary gear teeth of the toothed ring 102 formed on the top of the side adjusting ring 60. The serrations 104 on an inner horizontal portion 60*a* of the side adjusting ring 60 mate with complementary serrations 106 formed on a reduced diameter cylindrical projection 62*a* of the carrier ring 62 to lock the side adjusting ring 60 and carrier ring 62 together. Manual rotation of the upper end 70 of the shaft 66 with the tool 400 thus permits a user to move the adjustable arc tab 101 to a predetermined circumferential location that precisely adjusts the size of the arc of oscillation of the nozzle 14. Alternatively, the user can manually rotate the side adjusting ring 60 by gripping its outside surface and rotating it to achieve a coarse adjustment of the size of the arc of oscillation of the nozzle 14. The two different positions of the reversing planetary gear drive 12 and reversing mechanism 13 that cause the nozzle turret 26 to rotate in opposite directions are illustrated in FIGS. 15 and 16.

Only the circumferential position of the adjustable arc tab 101 (FIG. 4) can be changed by the user. The fixed arc tab 98 is fixed to the gear box housing 34 as it is a molded extension of one of its fins 100. When the sprinkler 10 is installed on a vertical riser connected to a subterranean pipe, the outer case 18 is rotated by hand to set one arc limit, which is established by the location of the fixed arc tab 98. Alternately, this can be achieved by the user removing the riser 22 and reinstalling it in the outer case 18 in a preferred rotational position. The side adjusting ring 60 is then turned by hand to roughly or approximately set the other arc limit by moving the adjustable arc tab 101 to the desired circumferential position. If needed, the upper end 70 of the shaft 66 is then depressed and turned with the tool 400 to accomplish a fine adjustment to the arc other limit established by the circumferential position of the adjustable arc tab 101.

Thus the sprinkler 10 includes a versatile adjustable arc setting mechanism that provides an installer with two alternate ways to manually change a position of the adjustable arc tab 101 so that the sprinkler 10 has an arc of coverage of a predetermined desired size. The adjustable arc setting has two different portions which are independently operable. The adjustable arc setting mechanism of the sprinkler 10 has a first portion that includes the side adjusting ring 60 and carrier ring 62. The first portion of the arc adjusting mechanism has a higher drive ratio and is manually movable to change the circumferential position of the adjustable arc tab 101 relative to the fixed arc tab 98 for rapidly achieving coarse arc size adjustments. The adjustable arc setting mechanism of the sprinkler 10 has a second portion that includes the adjusting gear 64, arc adjusting shaft 66 and spring 68. The second portion of the arc adjusting mechanism has a lower drive ratio and is manually movable to change the circumferential position of the adjustable arc tab 101 relative to the fixed arc tab 98 for less rapidly achieving fine arc size adjustments.

Persons skilled in the art of installing residential and commercial irrigation systems will appreciate that the sprinkler 10 can be readily installed at an irrigation site by screwing a female threaded inlet 18a (FIG. 1) at the lower end of the outer case 18 over the male threaded segment of a riser pipe (not illustrated). Pressurized water can then be supplied to the sprinkler 10. A sector of turf or other landscape vegetation of a predetermined sector size can be watered by selecting a sector size between about sixty and approximately two hundred and seventy degrees by first rotating the outer case 18, or by re-positioning the riser 22 rotationally within the case 18, to set the first arc limit. Then the user can quickly set the second arc limit in a coarse manner using the side adjusting ring 60 (FIG. 2). Fine adjustments to the arc size can be manually achieved by engaging the tool 400 with the upper end 70 (FIG. 3) of the arc adjusting shaft 66, and pushing down on the tool 400 to engage the arc adjusting gear 64 with the toothed ring 102. The tool 400 can then be twisted to effectuate fine adjustments of the second arc limit.

Referring to FIGS. 19-22 a gear driven sprinkler 110 has a removable secondary nozzle holder 128 mounted to a nozzle turret 126. The removable secondary nozzle holder 128 includes parts for installing secondary nozzles such as 116 or a secondary port plug 118. Any number of plugs 118 or secondary nozzles 116 may be installed in different ports of the secondary nozzle holder 128 to achieve the desired performance of the sprinkler. A primary nozzle 114 is installed in a primary nozzle port formed in the nozzle turret 126. Further details of the removable secondary nozzle holder are described and illustrated in co-pending U.S. patent application Ser. No. 13/154,698 filed Jun. 7, 2011 by Michael L. Clark et al. and entitled "Irrigation Sprinkler with Re-configurable Secondary Nozzle Holder", also assigned to Hunter Industries, Inc., the entire disclosure of which is hereby incorporated by reference.

Figure 20:
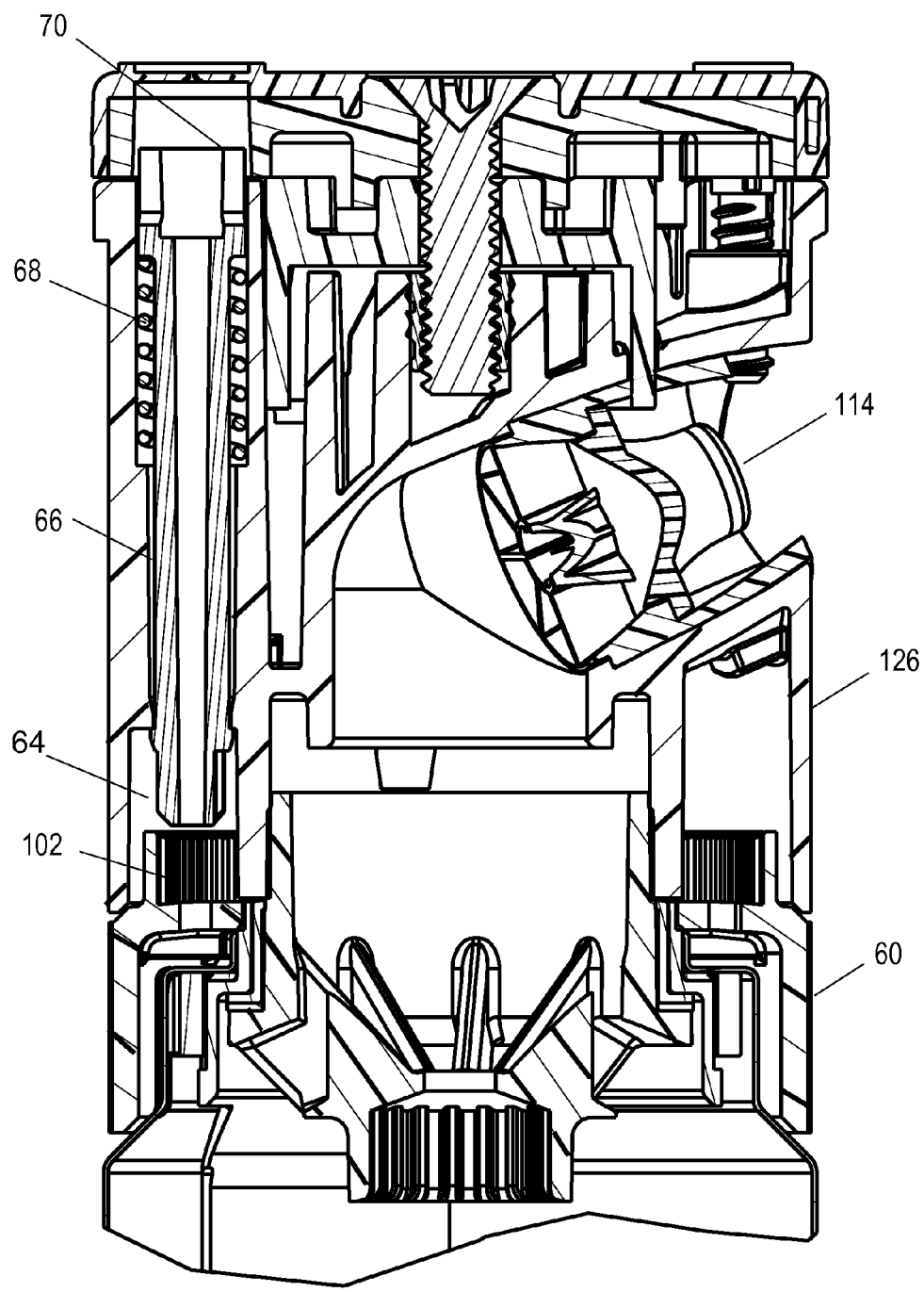
FIG. 20 is an enlarged fragmentary vertical sectional view of the upper portion of the sprinkler of FIG. 19 with its nozzle turret rotated ninety degrees and its top accessible arc adjusting shaft in its raised position in which it is not engaged with the side adjusting ring
Figure 21:
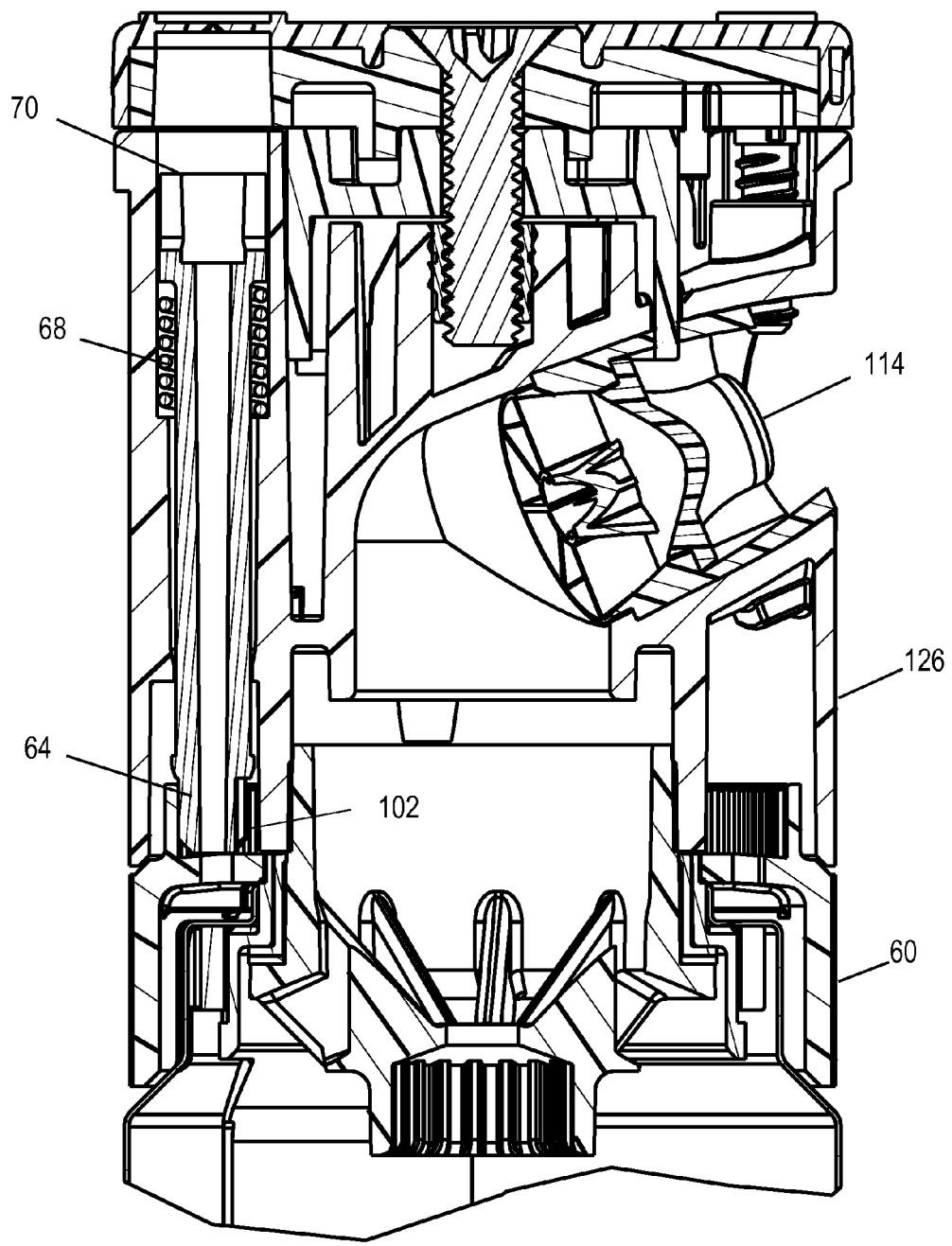
FIG. 21 is a view similar to FIG. 20 with the nozzle turret rotated ninety degrees and the top accessible arc adjusting shaft in its lowered position in which it is engaged with the side adjusting ring.
Figure 22:
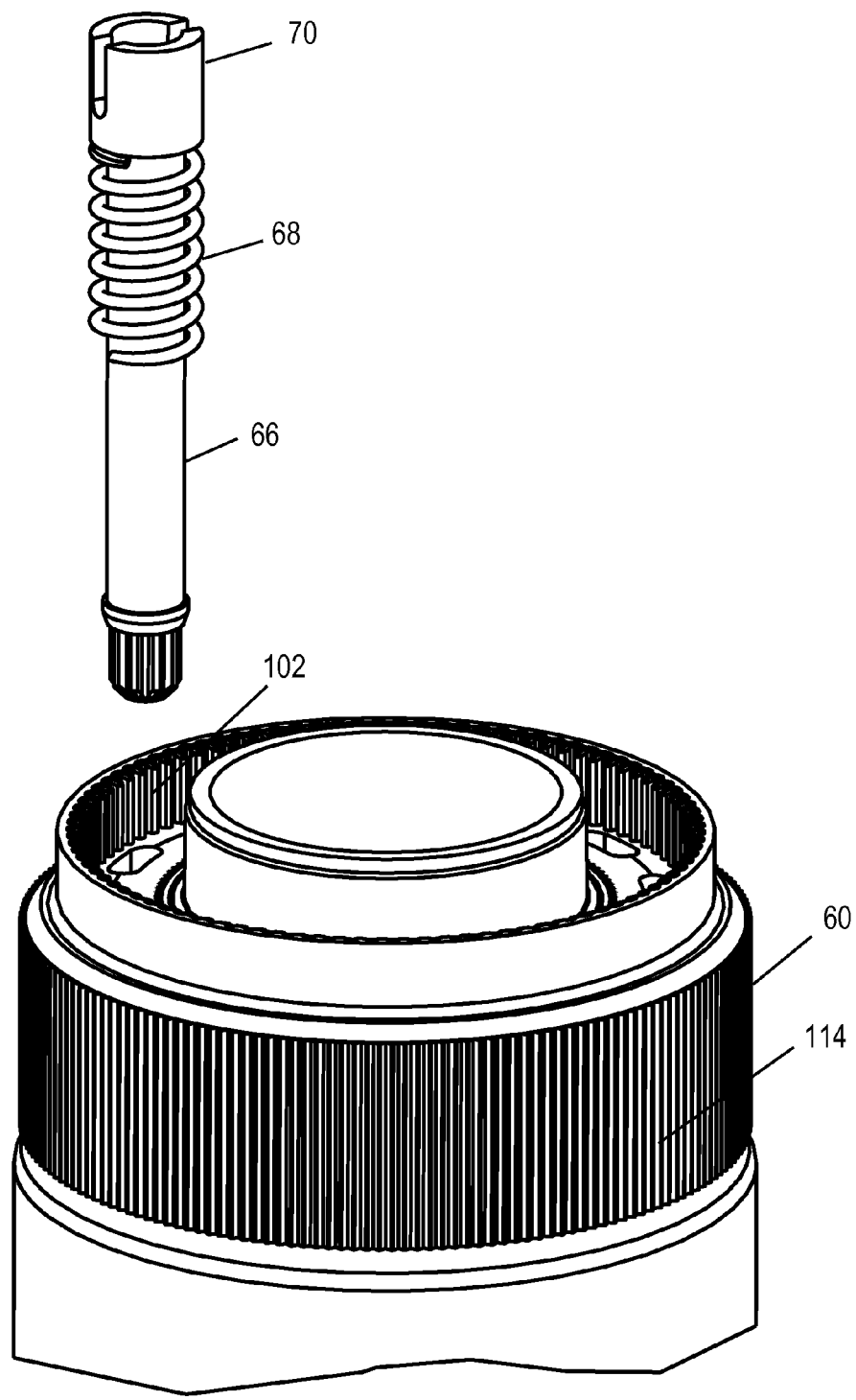
FIG. 22 is an exploded fragmentary isometric view illustrating the relationship of the top accessible arc adjusting shaft and the side adjusting ring of the sprinkler of FIG. 19.

The side adjusting ring 60 (FIG. 22) includes an outer gripping surface in the form of vertical ribs that are formed around the entire circumference of its outer perimeter. The vertical ribs provides a knurling that allows the user to firmly grip the side adjusting ring 60 and turn it, even in wet conditions. Other than incorporating the removable secondary nozzle holder 128, the arc adjusting mechanism of the embodiment of FIGS. 19-22 functions the same as that of the embodiment illustrated in FIGS. 1-18. FIG. 20 illustrates the arc adjusting shaft 66 in its normal raised position maintained by the coil spring 68. When the arc adjusting shaft 66 is in its raised position the teeth of the adjusting gear 64 are elevated above the teeth of the toothed ring 102 on the top of the side adjusting ring 60. In this configuration, the user can more quickly turn the side adjusting ring 60 to set the desired position of the adjustable arc tab 101. FIG. 21 illustrates the arc adjusting shaft 66 in its lowered position. This is accomplished by inserting the tool 400 (FIG. 25) into the upper end 70 (FIG. 20) of the arc adjusting shaft 66 and pressing down to overcome the spring force of the coil spring 68. This causes the adjusting gear 64 to engage the teeth of the toothed ring 102 on the top of the side adjusting ring 60. The user can then manually rotate the tool 400 to rotate the side adjusting ring 60 to cause the position of the adjustable arc tab 101 to move accordingly. The gear reduction achieved when the teeth of the adjusting gear 64 engage the teeth of the toothed ring 102 allows the operator to move the adjustable arc tab 101 at a much slower rate per degree of rotation to more accurately and finely set the desired size of the arc of oscillation of the sprinkler 10.

Figure 23:
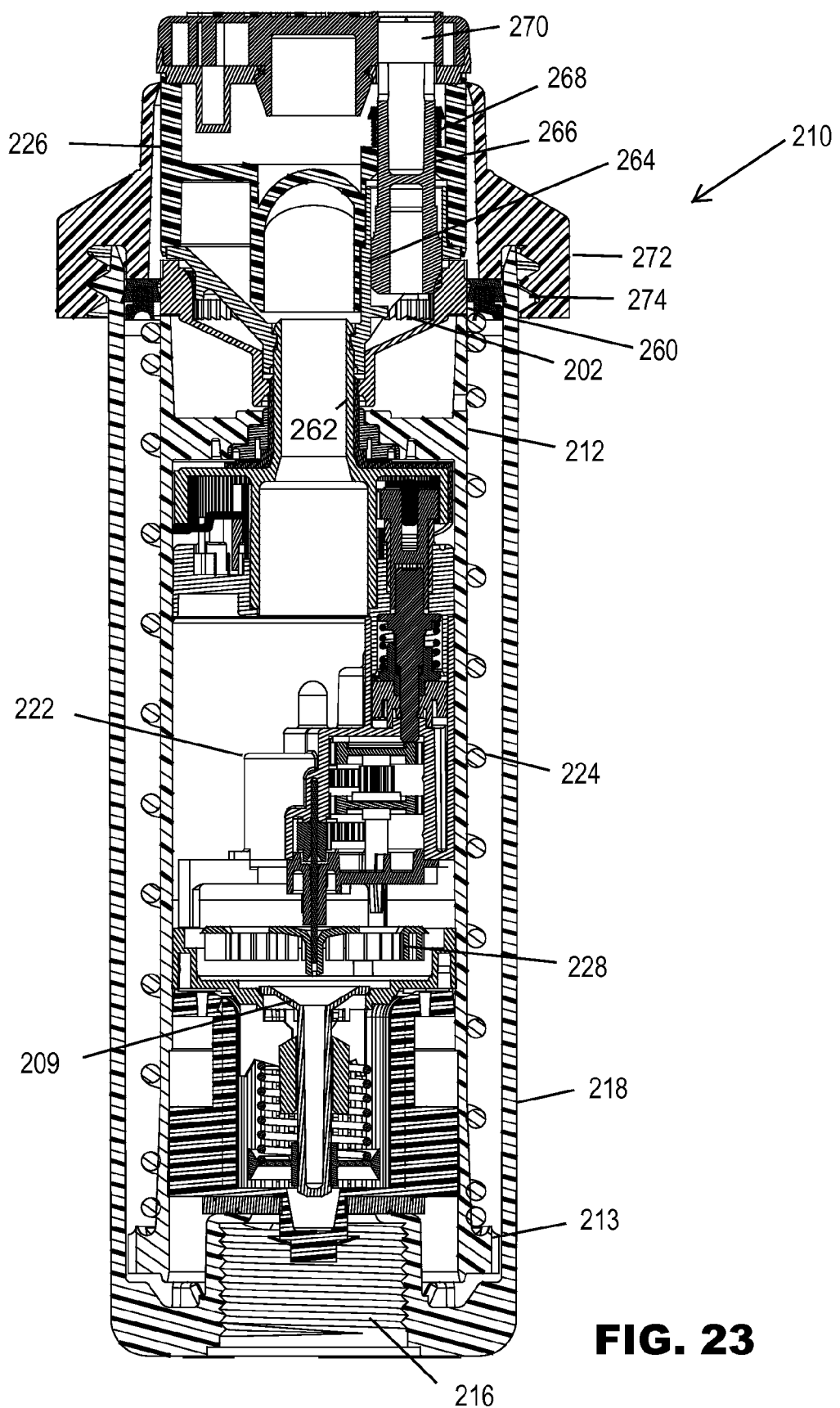
FIG. 23 is a vertical sectional view of another embodiment of the present invention incorporated in a staggered gear drive rotor-type sprinkler with a reversing frame mechanism.
Figure 26:
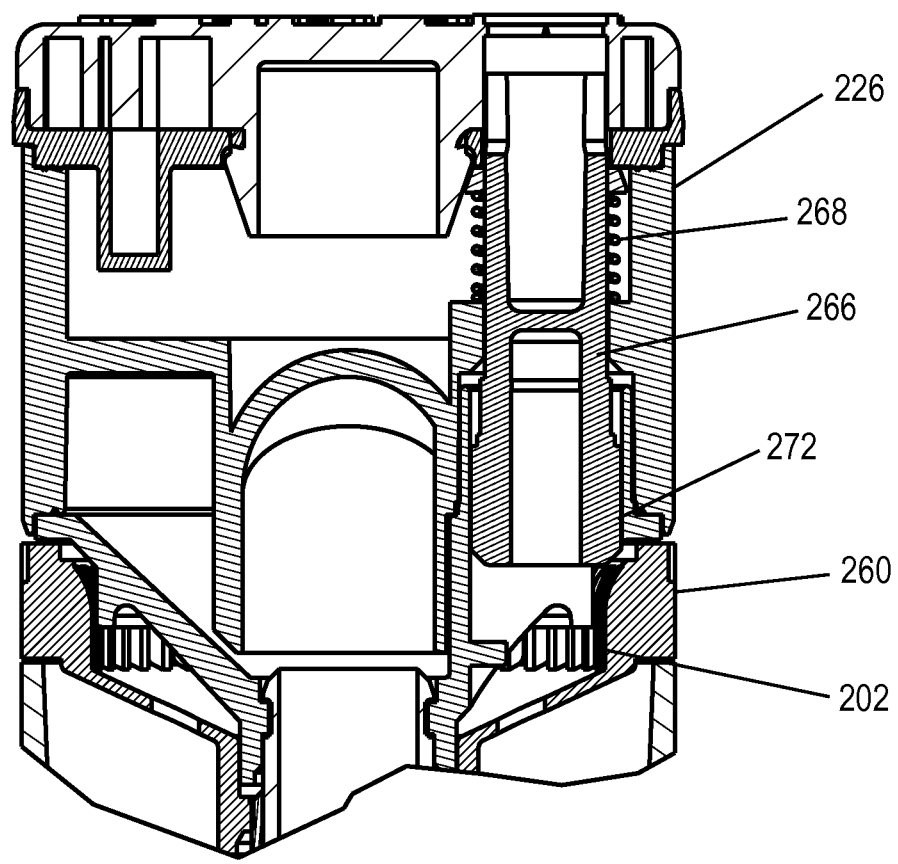
FIG. 26 is an enlarged portion of FIG. 24 illustrating the arc adjusting components with the top arc adjusting shaft in its raised position in which it is not coupled with the side adjusting ring.

Referring to FIGS. 23-26, in accordance with another embodiment of the present invention, a pop-up rotor-type sprinkler 210 includes an inner cylindrical riser 212 that extends telescopically within a surrounding cylindrical outer housing 218. The outer housing 218 has a female threaded lower inlet 216 that screws over a male threaded riser (not illustrated) connected to a subterranean water supply line. The riser 212 is normally held in its retracted position by a surrounding coil spring 224 compressed between a lower flange 213 of the riser 212 and a female male threaded cylindrical top cap 272 screwed over a male threaded upper end 274 of the outer housing 218. When pressurized water enters the riser 12 through the inlet 216 the riser 212 telescopes to its extended position. Water flows into the riser 212 via a spring-operated regulator valve 209 which ensures that a turbine 228 is driven in a predetermined desired speed range. The turbine 228 drives an input gear of a reversing mechanism through a gear train reduction 222. The gear train reduction 222 has staggered gears as distinguished from a planetary gear drive configuration. The reversing mechanism of the sprinkler includes a set of four meshed pinion gears rotatably supported between upper and lower arcuate frames that rock back and forth so that two counter rotating output pinion gears alternately engage and drive a bull gear assembly 214 (FIG. 24) in opposite directions. The details of the operation of a staggered gear drive with a reversing frame device that drives the bull gear 214 are disclosed in U.S. Pat. No. 7,861,948 granted Jan. 4, 2011 to John D. crooks entitled "Adjustable Arc Rotor-type Sprinkler with Selectable Uni-directional Full Circle Nozzle Rotation", that the entire disclosure of which is hereby incorporated by reference. Said patent is also assigned to Hunter Industries, Inc. The bull gear 214 turns a hollow drive shaft 262 (FIG. 23). The hollow drive shaft 262 has external teeth or splines that fit within splines formed on an inner cylindrical extension of the bull gear 214. A cylindrical nozzle turret 226 is mounted to the upper end of the hollow drive shaft 262 for rotation at the upper end of the riser 212. The nozzle turret 226 encloses a removable nozzle (not illustrated) that ejects a stream of water that is conveyed through the hollow drive shaft 262. The nozzle turret 226 encloses an arc adjusting shaft 266 (FIG. 24) and a side adjusting ring 260 to allow the user to rapidly adjust the arc of operation by turning the side adjusting ring 260 by hand when the riser 212 is extended from the outer housing 218. The user can more accurately set the arc of coverage using the upper adjusting shaft 266. FIGS. 24 and 25 illustrate the upper adjusting shaft 266 in its lowered position. The tool 400 can be inserted into the top head 270 the of the arc adjusting shaft 266 and pressing down to overcome the force of the spring 268 and engage an adjusting gear 264 on the lower end of the arc adjusting shaft 266 with a plurality of inner gear teeth 202 (FIG. 26) formed on the side adjusting ring 260. In this position the user can rotate the tool 400 to rotate the side adjusting ring 260 to cause the position of the adjustable arc tab (not visible in FIGS. 24 and 25) to move accordingly. The reduction of the teeth of the adjusting gear 264 to the inner gear teeth 202 allows the operator to move the adjustable arc tab at a much slower rate per degree of rotation to more accurately set the size of the arc of coverage than can be achieved soley by rotating the side adjusting ring 260. FIG. 26 illustrates the arc adjusting shaft 266 in its normal position with spring 268 keeping the adjusting gear 264 elevated above the internal teeth 202 of the side adjusting ring 260. In this configuration, the user can more easily and quickly turn the side adjusting ring 260 to set the desired position of the adjustable arc tab.

Figure 27:
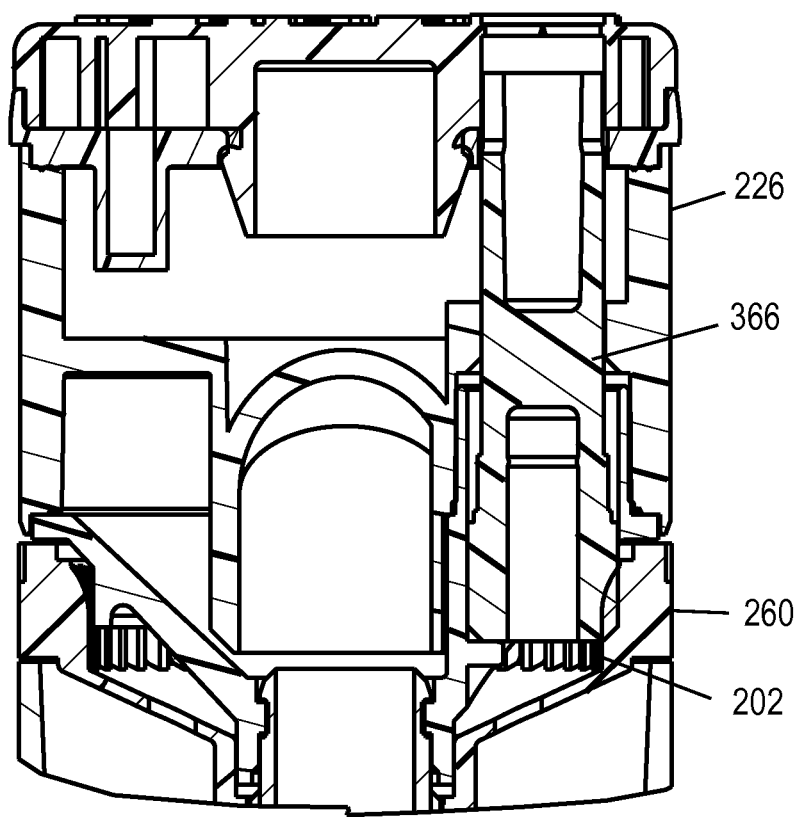
FIG. 27 is fragmentary vertical sectional view of another embodiment of the present invention that includes a top accessible arc adjusting shaft that is always engaged with the side adjusting ring.

Referring to FIG. 27 another alternate embodiment is similar to that just described except that the arc adjusting shaft 366 does not include a coil spring to hold it in a position above the internal teeth 202 of the side adjusting ring 260. In this embodiment, the coefficient of drag and the gear reduction between the arc adjusting shaft 366 and the side adjusting ring 260 is such that the arc adjusting shaft 366 can always be engaged with the outer side adjusting ring 260 and the user is able to either insert a tool 400 into the top of the arc adjusting shaft 366 and adjust the arc of rotation of the sprinkler, or turn the adjusting ring 360 to set the size of the arc of oscillation. In the event the user adjusts the arc setting using the adjusting ring 360, the arc adjusting shaft 366 rotates at a significantly higher speed of rotation than the side adjusting ring 260 and rotates in an amount proportion to the relative to the adjustment of the arc setting.

FIGS. 28-37 illustrate a further alternate embodiment in the form of a gear driven sprinkler 310 that has a removable secondary nozzle holder 128 mounted to a nozzle turret 326. A primary nozzle 114 is installed in a primary nozzle port formed in the nozzle turret 326. A two position side adjusting ring 360 (FIG. 29) includes an outer gripping surface in the form of vertical ribs that are formed around the entire circumference of its outer perimeter. The vertical ribs provides a knurling that allows the user to firmly grip the side adjusting ring 360 and turn it, even in wet conditions. The two position side adjusting ring 360 is both vertically reciprocable along the central vertical axis of the sprinkler 310 and rotatable about the same axis. The two position side adjusting ring 360 allows the operator to adjust the arc setting of the sprinkler in a course adjustment mode by twisting the same when it is in an upper position, and also allows the operator to effectuate a finer arc adjustment when moved to a lower position and then twisted. Other than incorporating several different components, the sprinkler 310 of FIGS. 28-37 has a construction similar to that of the sprinkler 10 illustrated in FIGS. 1-18. The different components of the sprinkler 310 include the nozzle turret 326, the two position adjusting ring 360, and the gear drive components associated with the operation of the two position adjusting ring 360. The sprinkler 310 lacks the adjusting gear 64, the arc adjusting shaft 66, and the coil spring 68. A generally tubular riser 322 (FIG. 28) of the sprinkler 310 encloses a reversing planetary gear drive 312. The reversing planetary gear drive 312 has a construction similar to that of the reversing planetary gear drive 12 illustrated in FIG. 3 with the exception of a plurality of slots 335 (FIG. 32) that are formed in the top of the gear box housing 334 that retain and guide a lower arcuate edge of an adjustable arc tab 311 (FIG. 31) as it is rotated about the vertical central axis of the sprinkler 310. The adjustable arc tab 311 is integrally formed with, and extends vertically downward from, the outer rim of a carrier ring 315.

Figure 30:
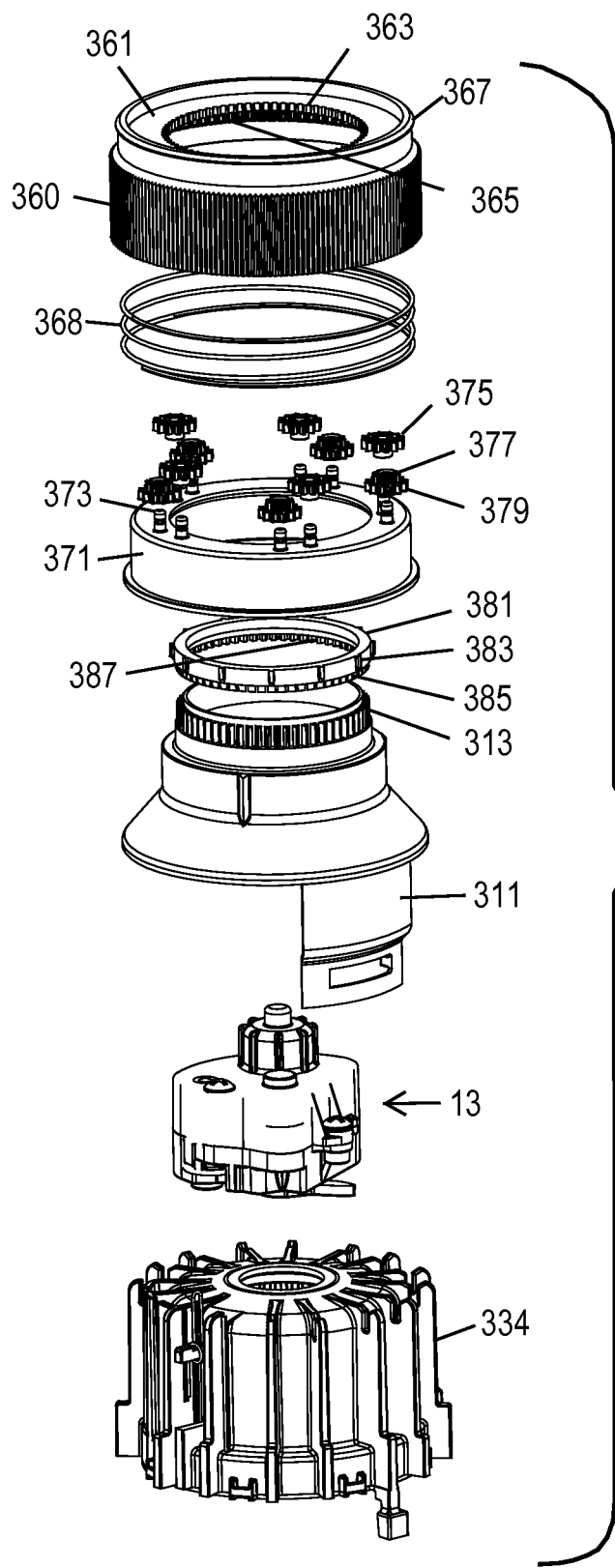
FIG. 30 is an exploded isometric view of the sprinkler of FIG. 28 illustrating details of the mechanisms associated with its two position side adjusting ring.
Figure 31:
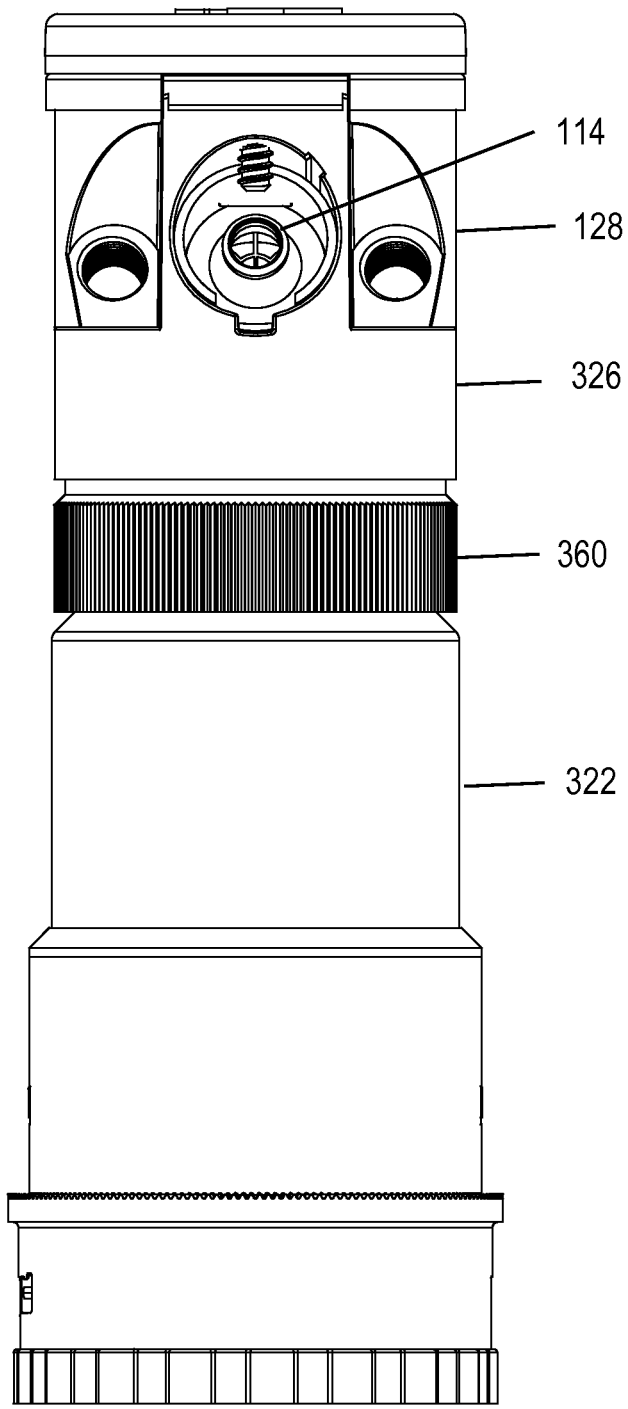
FIG. 31 is a front elevation view of the riser of the sprinkler of FIG. 28 with the two position side adjusting ring in its lower position allowing the operator to twist the two position side adjusting ring and thereby achieve fine adjustment of the position of one of the arc limits between which the nozzle turret oscillates.
Figure 32:
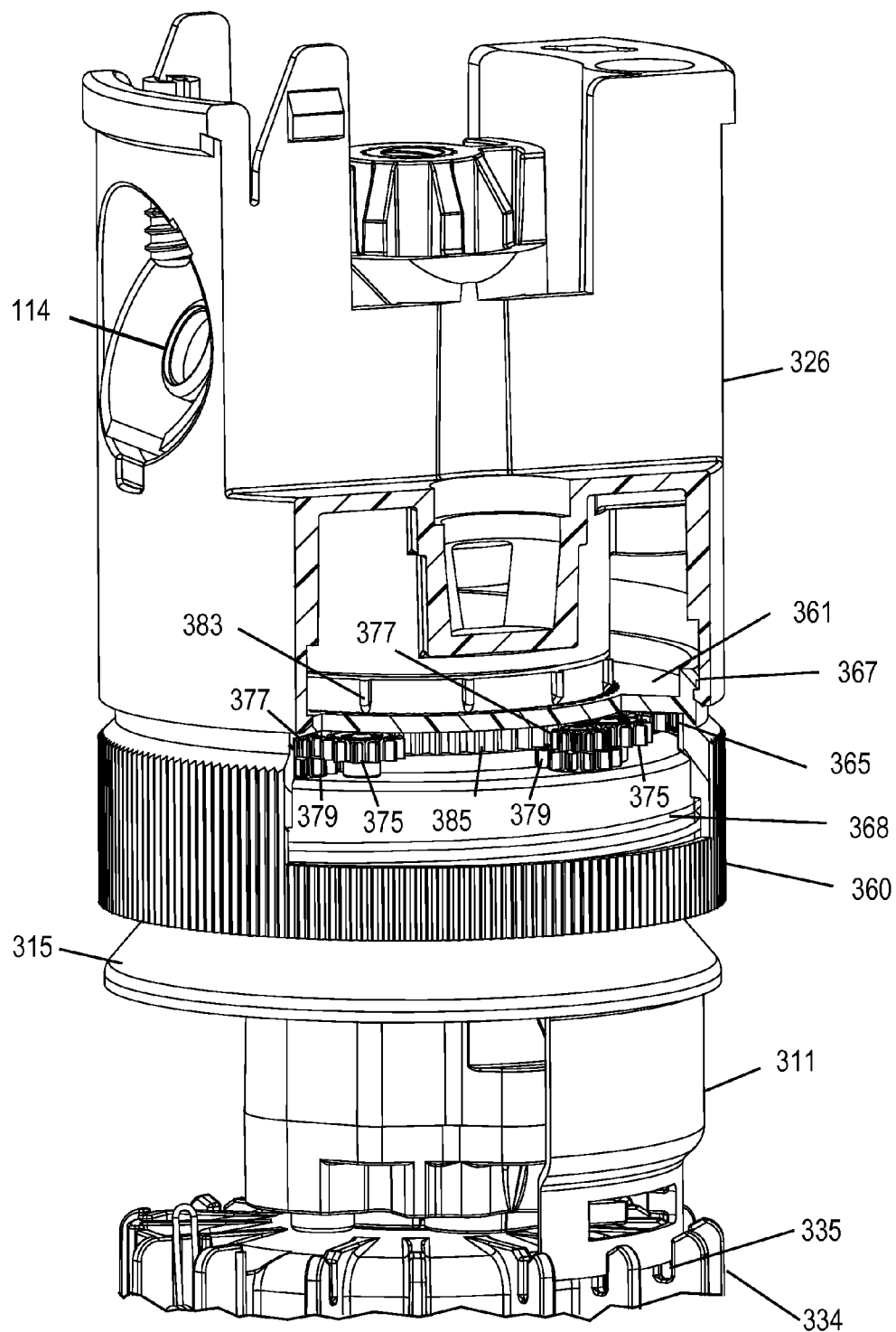
FIG. 32 is an enlarged isometric view of the nozzle turret, carrier ring and reversing mechanism of the sprinkler of FIG. 28 illustrating further details of the mechanisms associated with the two position side adjusting ring that enable the two position side adjusting ring to effectuate a gear reduction that allows fine adjustment of one of the arc limits of the sprinkler when the two position side adjusting ring is twisted in its lower position. In this figure the two position side adjusting ring is in its lower position.
Figure 33:
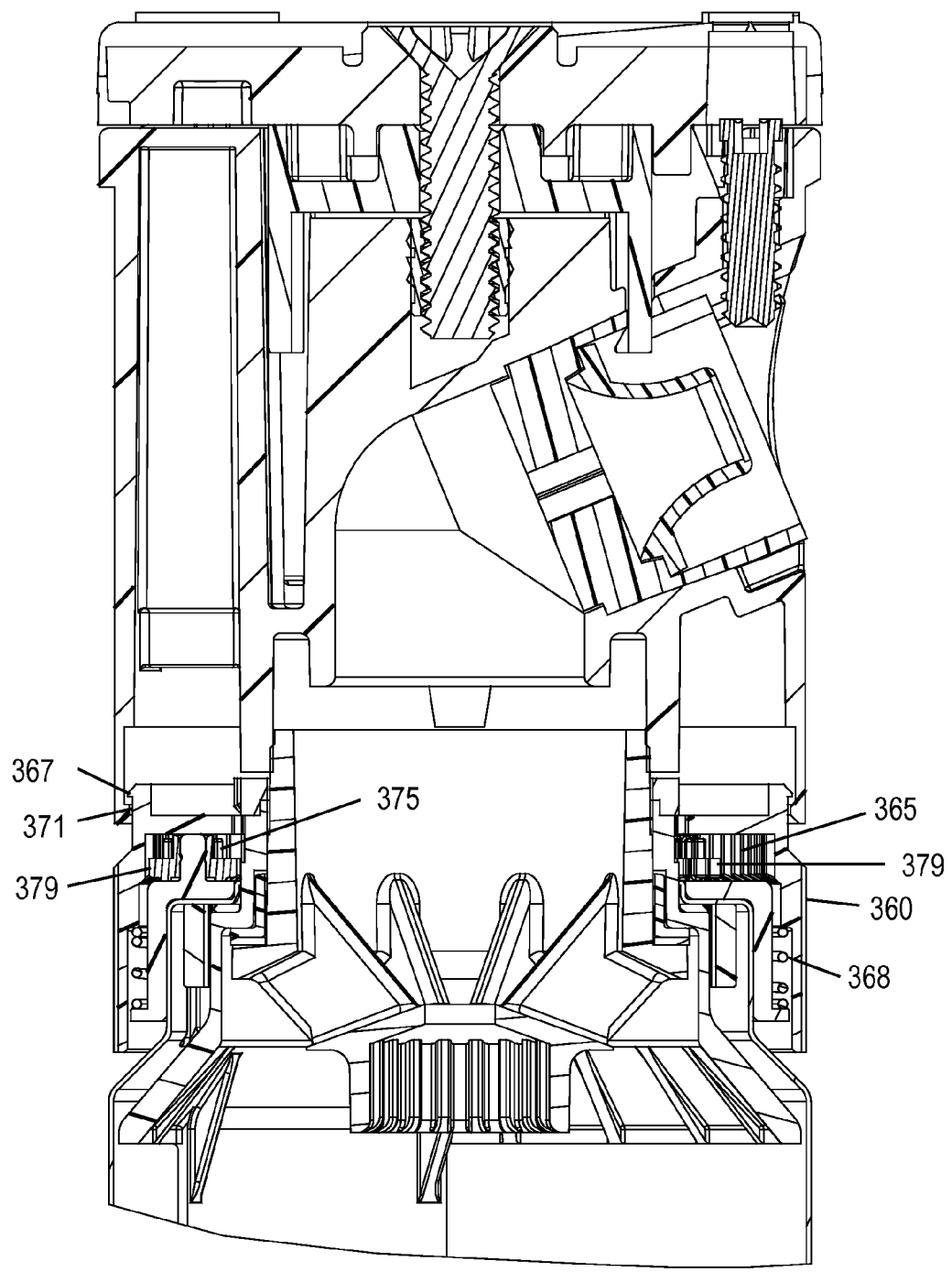
FIG. 33 is an enlarged vertical sectional view of the nozzle turret of the sprinkler of FIG. 28 and the mechanisms below the nozzle turret. In this figure the two position side adjusting ring is in its lower position.
Figure 34:
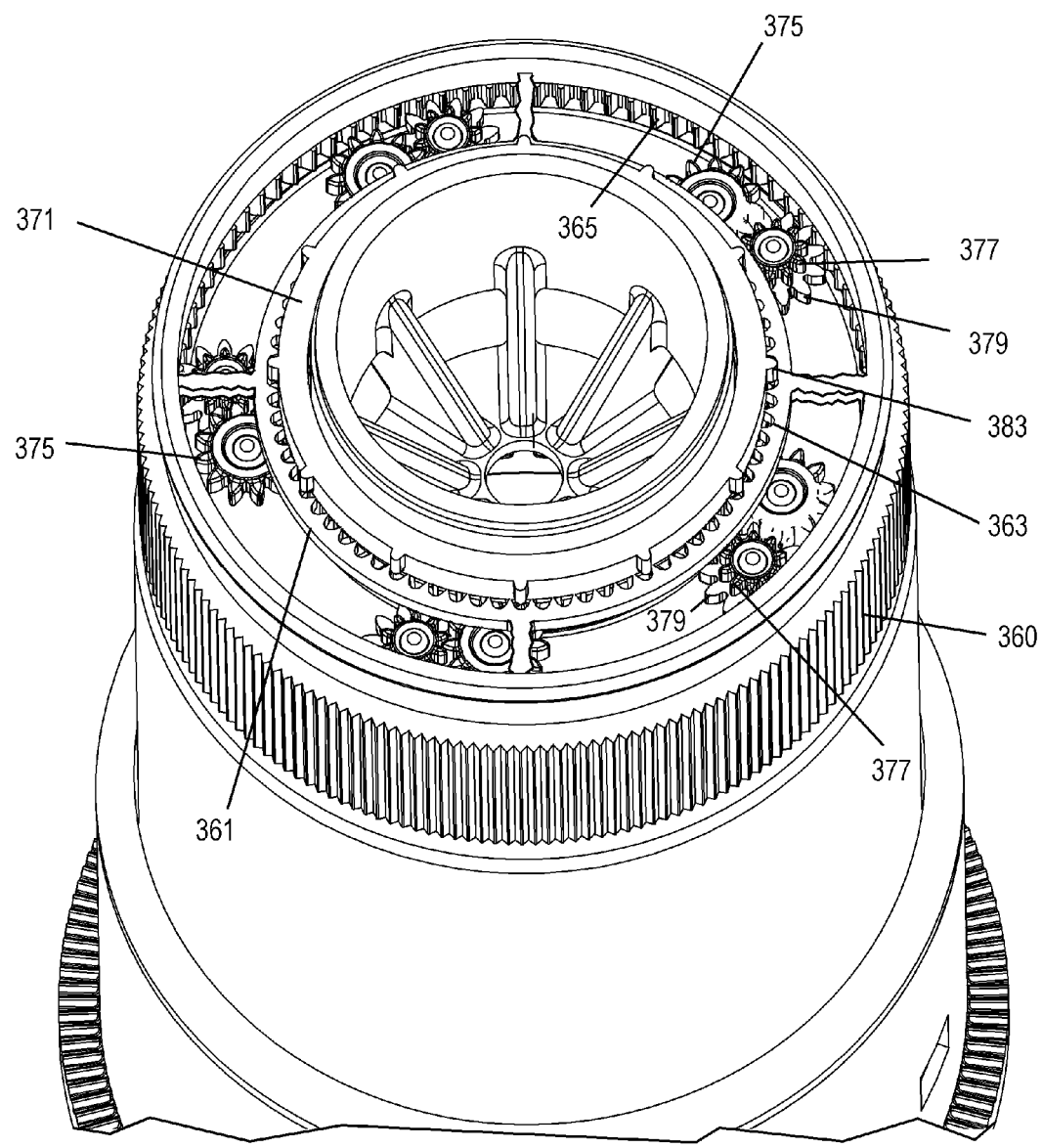
FIG. 34 is an enlarged fragmentary isometric view of the sprinkler of FIG. 28 with its nozzle turret removed to illustrate further details of the mechanisms associated with the two position side adjusting ring that enable coarse and fine adjustment of one of the arc limits of the sprinkler between which the nozzle turret oscillates. In this figure the two position side adjusting ring is in its lower position.

Referring to FIG. 30, the two position side adjusting ring 360 includes an internal flange 361 with drive cups 363 that are formed on its innermost diameter. The drive cups 363 are formed to loosely fit over a plurality of circumferentially spaced drive tabs 383 formed on a drive ring 381. The two position side adjusting ring 360 also includes an internal ring gear 365 which is formed to mesh with a plurality of lower cluster gears 379. An upper cluster gear 377 is formed on the top of each of the lower cluster gears 379. The upper cluster gears 377 mesh with a plurality of corresponding idler gears 375 which are always engaged with an outer ring gear 385. The outer ring gear 385 is formed on a lower surface of the drive ring 381. The gears 375, 377 and 379 are all supported for rotation on a plurality of corresponding idler shafts 373 which are formed on the upper surface of a gear support ring 371. An internal spline 387 formed on the inner surface of the drive ring 381 is formed to fit snuggly over an external spline 313 of the carrier ring 315 to form a positive engagement between the two parts so the adjustable arc tab 311 always moves directly in response to radial forces applied to the drive ring 381.

Figure 28:
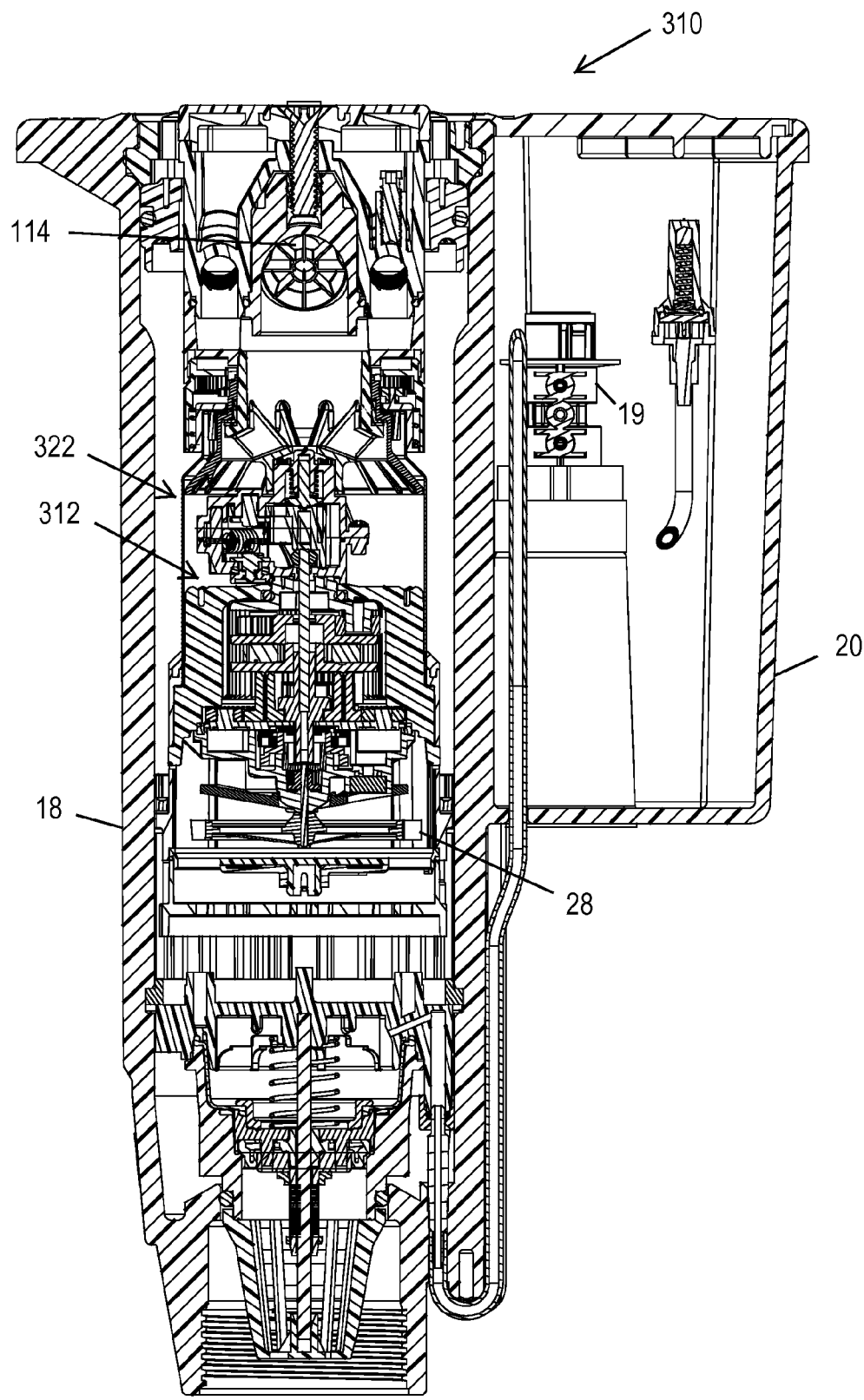
FIG. 28 is a vertical sectional view of a rotor-type sprinkler incorporating another embodiment of the present invention in which a two position side adjusting ring can be twisted in a raised position to effectuate coarse arc adjustment and twisted in a lower position to effectuate fine arc adjustment.
Figure 29:
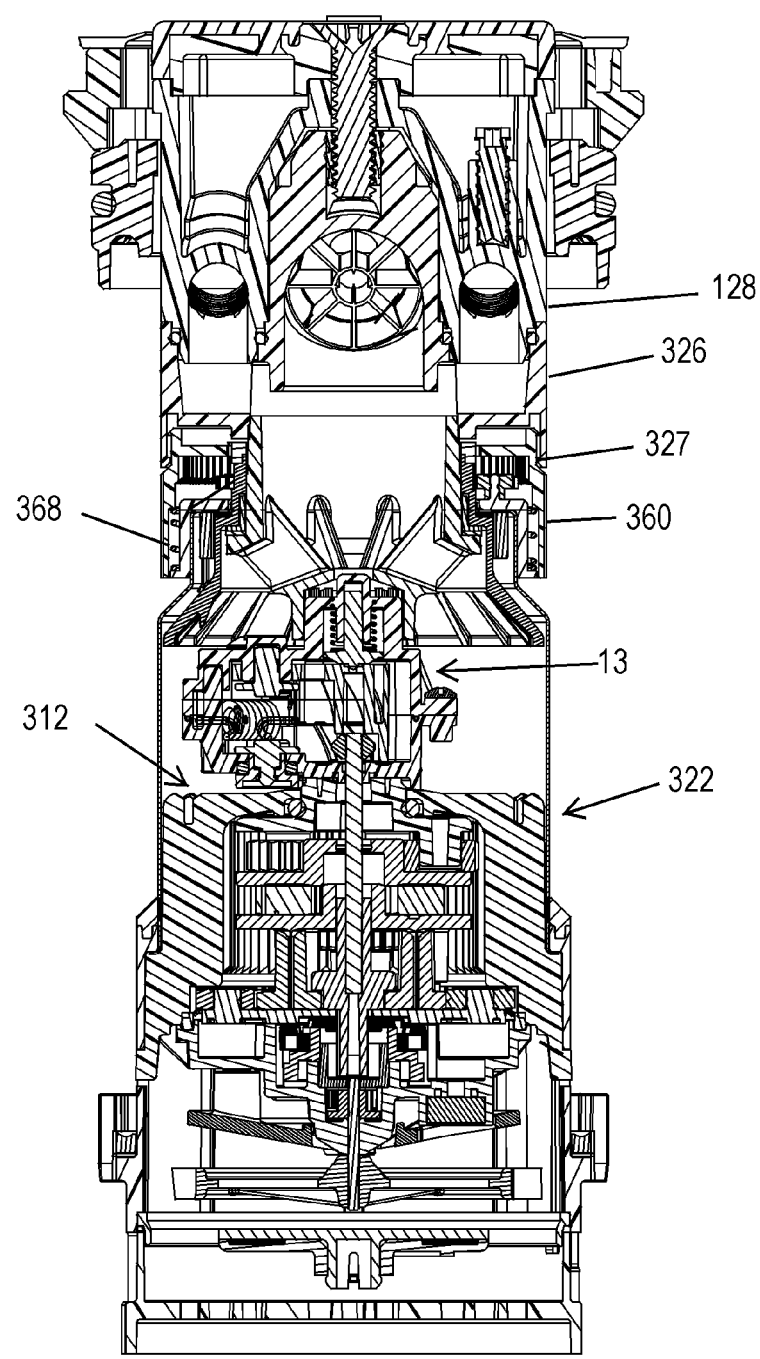
FIG. 29 is an enlarged vertical sectional view of the riser and nozzle turret of the sprinkler of FIG. 28.

FIGS. 31-34 illustrate the sprinkler of FIG. 28 with the two position side adjusting ring 360 in its lower position. In this lower position the internal ring gear 365 meshes with the lower cluster gears 379. The upper cluster gears 377 provide a reduction to the idler gears 375. The idler gears 375 are always meshed with the outer ring rear 385 that is formed on the lower section of the drive ring 381. The drive ring 381 is positively coupled to the adjustable arc tab 310. With the two position side adjusting ring 360 in its lower position illustrated in FIGS. 31-34, a one-to-one coupling between the two position side adjusting ring 360 and the drive ring 381 is disengaged allowing the operator to make a fine adjustment to the arc of coverage of the sprinkler 310. When the operator turns the two position side adjusting ring 360 in its lower position, the reduction of the drive gears 377, 375, and 379 causes the adjustable arc tab 311 to move at a slower rate than the two position side adjusting ring 360. As a result, if the operator wants to make a fine adjustment, for example about ten degrees, to the arc of coverage of the sprinkler 310, he will have to rotate the side adjusting ring 360 substantially more than ten degrees to accomplish that amount of arc adjustment, thus giving the operator a finer control of the position of the adjustable arc tab 311.

Figure 35:
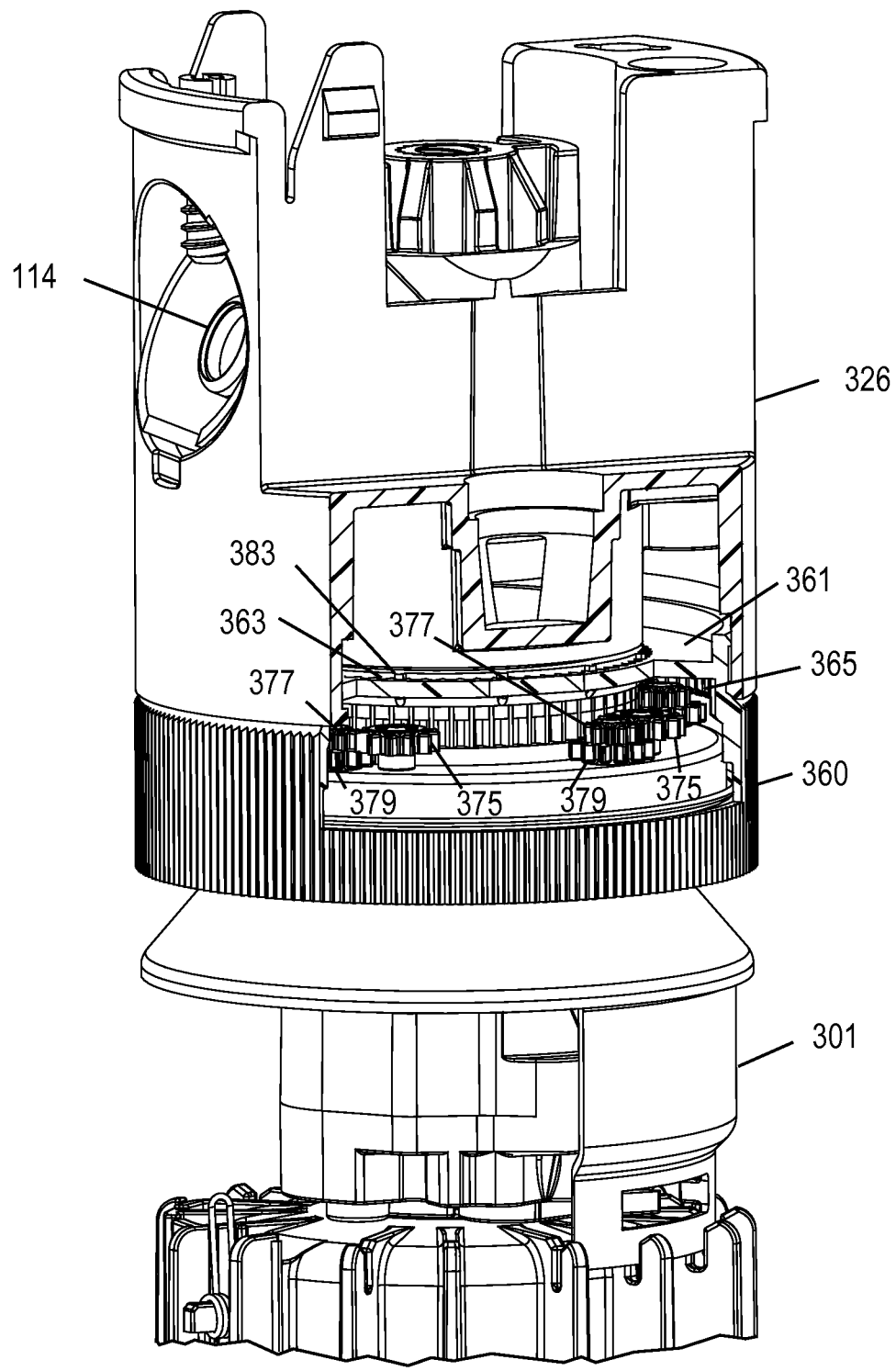
FIG. 35 is a view similar to FIG. 32 but instead showing the two position side adjusting ring in its upper position to facilitate coarse adjustment of the position of one of the arc limits.
Figure 36:
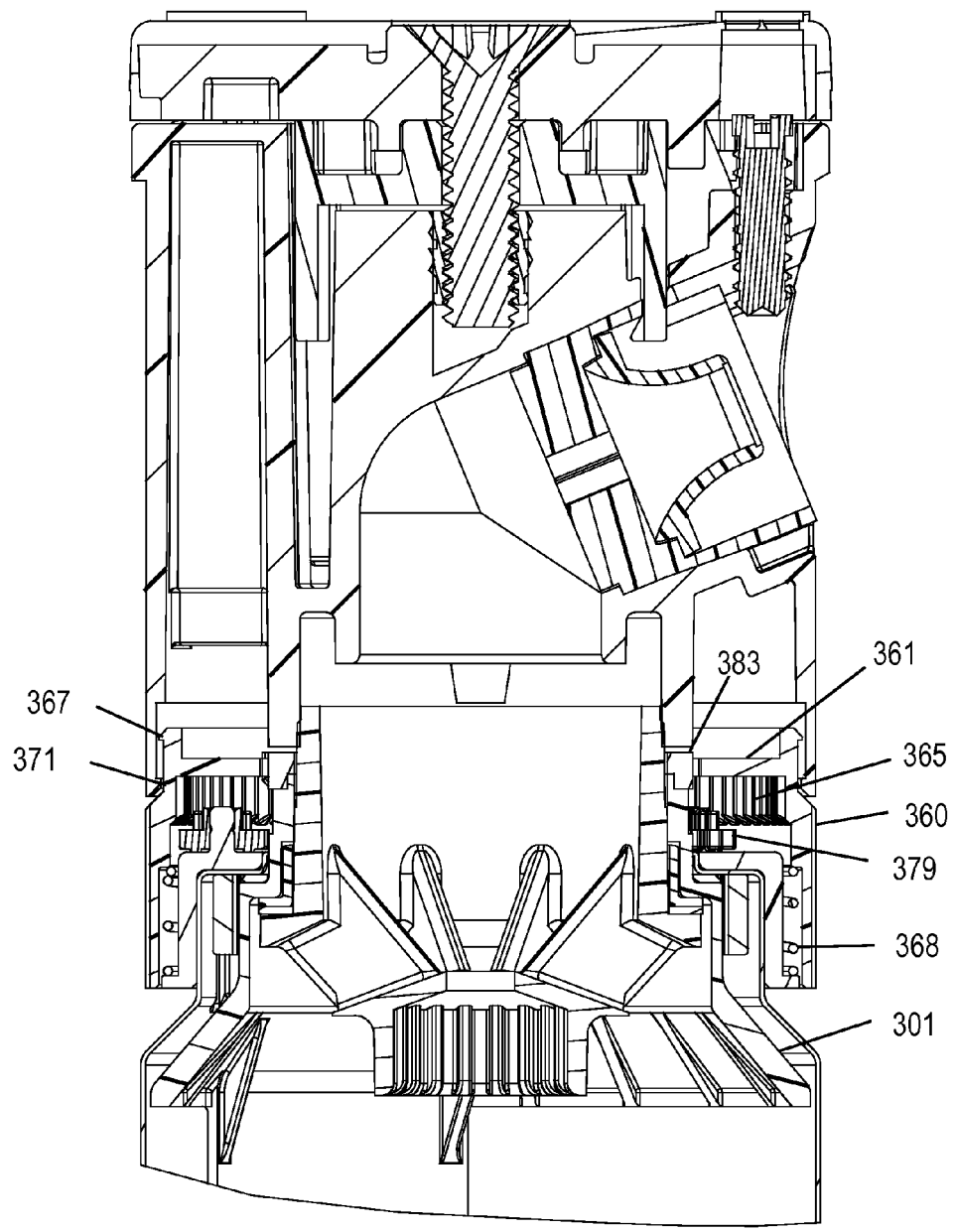
FIG. 36 is a view similar to FIG. 33 but instead showing the two position side adjusting ring in its upper position to facilitate coarse adjustment of the position of one of the arc limits.
Figure 37:
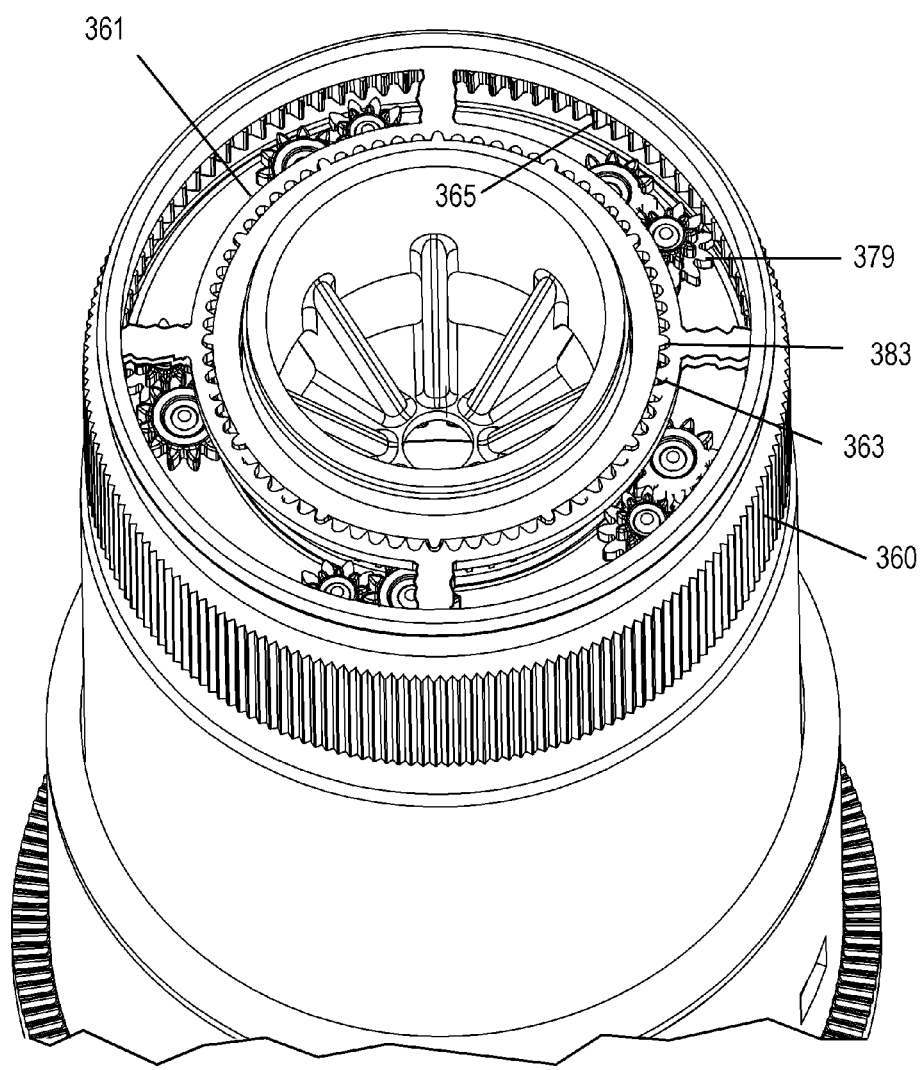
FIG. 37 is a view similar to FIG. 34 but instead showing the two position side adjusting ring in its upper position to facilitate coarse adjustment of the position of one of the arc limits.

FIGS. 35-37 illustrate the sprinkler 310 with the two position side adjusting ring 360 in the raised upper position. In this upper position the internal ring gear 365 is lifted away from, and does not contact, the lower cluster gears 379. As a result, the gear reduction of gears 375, 377 and 379 are disengaged and will not move the drive ring 381 when the two position side adjusting ring 360 is rotated. In this upper position, the internal drive cups 363 that are formed on the internal surface of the internal flange 316 of the two position side adjusting ring 360 are positively engaged with drive tabs 383 of the drive ring 381, With the two position side adjusting ring 360 in the upper position, the operator can quickly effectuate a coarse adjustment of the arc of coverage of the sprinkler 310. When the operator turns the two position side adjusting ring 360 in the upper position, the direct coupling of the two position side adjusting ring 360 to the drive ring 381 and the carrier ring 315 causes the adjustable arc tab 311 to move at the same rotational rate as the two position side adjusting ring 360. As a result, if the operator wants to make a coarse adjustment, for example, about ninety degrees, to the arc of coverage of the sprinkler 310, he can quickly accomplish this by rotating the two position side adjusting ring 360 the same ninety degrees. This allows the operator to make a coarse adjustment in less time to adjust the sprinkler 310 so that on one end of its range of oscillating motion, the nozzle turret 326 will reverse its motion at its desired final, or close to its desired final, limit or end point.

A coil spring 368 (FIGS. 30, 32 and 33) that surrounds the gear support ring 371 urges the two position side adjusting ring 360 to its upper position where the operator can set the position of the adjustable arc tab 311 using the coarse adjustment mode. If the operator wishes to fine tune the arc limit, he can push downward on the two position side adjusting ring 360 to compress the coil spring 368 and move the two position side adjusting ring 360 to the lower position. This will engage the geared reduction set and disengage the one-to-one coupling, allowing the operator to make a fine adjustment to the size of arc coverage of the sprinkler 310.

While we have described and illustrated several embodiments of a sprinkler with a coarse and fine arc adjustment mechanism, it should be understood that our invention can be modified in both arrangement and detail. For example, the sprinkler 10 could be modified to a simplified shrub configuration without the valve 16, outer case 18, valve actuator components 19, and housing 20. The two position side adjusting ring 360 could be configured to work with a staggered gear drive reduction sprinkler similar to the sprinkler 210. Therefore the protection afforded our invention should only be limited in accordance with the following claims.

We claim:

1. An irrigation sprinkler, comprising:
   a riser;
   a nozzle turret rotatably mounted at an upper end of the riser;
   a drive assembly supported in the riser and coupled to the nozzle turret for rotating the nozzle turret including a reversing mechanism having a pair of arc tabs, a position of one of the arc tabs being adjustable through an adjustable arc setting mechanism to change a size of an angle through which the nozzle turret oscillates to thereby pre-set an arc of coverage of the sprinkler, the adjustable arc setting mechanism including a side adjusting ring that is manually rotatable separate from the nozzle turret to effectuate a coarse adjustment of the position of the adjustable arc tab and an arc adjusting shaft that is manually movable to effectuate a fine adjustment of the position of the adjustable arc tab.

2. The sprinkler of claim 1 wherein the side adjusting ring of the adjustable arc setting mechanism is manually accessible from a side of the riser.

3. The sprinkler of claim 1 wherein the arc adjusting shaft of the adjustable arc setting mechanism is accessible with a tool from a top of the nozzle turret.

4. The sprinkler of claim 1 wherein the arc adjusting shaft can be coupled to the side adjusting ring with a gear drive.

5. The sprinkler of claim 1 wherein there is a one-to-one drive relationship between manual rotation of the side adjusting ring and movement of the adjustable arc tab.

6. The sprinkler of claim 1 wherein a lower end of the arc adjusting shaft has a first set of gear teeth that can engage a second set of gear teeth on the side adjusting ring.

7. The sprinkler of claim 6 wherein the arc setting mechanism further comprises a spring for biasing the arc adjusting shaft to a first position in which the first set of gear teeth on the arc adjusting shaft are disengaged from the second set of gear teeth on the side adjusting ring, the spring being compressible to allow the arc adjusting shaft to move to a second position in which the first set of gear teeth engage the second set of gear teeth.

8. The sprinkler of claim 1 wherein the adjustable arc setting mechanism further includes a carrier ring that carries the adjustable arc tab, the carrier ring being drivingly coupled to the side adjusting ring.

9. The sprinkler of claim 1 wherein the arc adjusting shaft has two positions.

10. The sprinkler of claim 9, wherein the arc adjusting shaft is operably coupled to the side adjusting ring when in a first position and is decoupled from the side adjusting ring when in a second position.

11. An irrigation sprinkler, comprising:
    a riser;
    a nozzle rotatably mounted at an upper end of the riser;
    a drive assembly supported in the riser and coupled to the nozzle for rotating the nozzle including a reversing mechanism having a pair of arc tabs, a position of at least one of the arc tabs being adjustable through an adjustable arc setting mechanism to change a size of an arc of coverage of the sprinkler, the adjustable arc setting mechanism including a two position side arc adjusting ring that is manually movable to change a position of the adjustable arc tab with a first drive ratio when the side arc adjusting ring is in a first position and a second drive ratio that is different from the first drive ratio when the side arc adjusting ring is in a second position.

12. The sprinkler of claim 11 wherein the side arc adjusting ring is accessible from a side of the riser and manually twistable in an upper position to effectuate the coarse adjustment of the position of the adjustable arc tab and manually twistable in a lower position to effectuate the fine adjustment of the position of the adjustable arc tab.

13. The sprinkler of claim 11 wherein the side arc adjusting ring of the adjustable arc setting mechanism is manually accessible from a side of the riser.

14. The sprinkler of claim 11 wherein the nozzle is mounted in a nozzle turret.

15. The sprinkler of claim 11 wherein the side arc adjusting ring is coupled to the adjustable arc tab via a gear reduction coupling when the side arc adjusting ring is in the second position, and wherein the gear reduction coupling includes a plurality of upper cluster gears and a plurality of lower cluster gears.

16. The sprinkler of claim 15 wherein the gear reduction coupling includes an internal ring gear that meshes with the plurality of lower cluster gears.

17. The sprinkler of claim 11 wherein the first drive ratio if 1:1 and the second drive ratio is greater than 1:1.

18. The sprinkler of claim 11 wherein the side arc adjusting ring may be manually moved in an axial direction between the first position and the second position.

19. An irrigation sprinkler, comprising:
    a riser;
    a nozzle turret rotatably mounted at an upper end of the riser;
    a drive assembly supported in the riser and coupled to the nozzle turret for rotating the nozzle turret including a reversing mechanism having a pair of arc tabs, a position of at least one of the arc tabs being adjustable through an adjustable arc setting mechanism to change a size of an angle through which the nozzle turret oscillates to thereby pre-set an arc of coverage of the sprinkler, the adjustable arc setting mechanism including a first portion including a side adjusting ring that is manually accessible from a side of the riser and manually rotatable to effectuate a coarse adjustment of a circumferential location of the adjustable arc tab, the adjustable arc tab being carried by a carrier ring rotatably coupled to the side adjusting ring, and a second portion including an arc adjusting shaft having an upper end that is manually accessible from a top of the nozzle turret and manually depressible and twistable with a tool to cause an arc adjusting gear on a lower end of the arc adjusting shaft to engage a plurality of teeth formed on the side adjusting ring and rotate the side adjusting ring to effectuate a fine adjustment of the circumferential location of the adjustable arc tab.

* * * * *